United States Patent
Maeng et al.

(10) Patent No.: US 11,648,849 B2
(45) Date of Patent: May 16, 2023

(54) DEVICE, SYSTEM AND METHOD FOR PREDICTING BATTERY CONSUMPTION OF ELECTRIC VEHICLE

(71) Applicant: LG ELECTRONICS INC., Seoul (KR)

(72) Inventors: Jichan Maeng, Seoul (KR); Beomoh Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 383 days.

(21) Appl. No.: 16/920,361

(22) Filed: Jul. 2, 2020

(65) Prior Publication Data

US 2021/0138927 A1    May 13, 2021

(30) Foreign Application Priority Data

Nov. 13, 2019  (KR) .................. 10-2019-0144802

(51) Int. Cl.
| | |
|---|---|
| *B60L 58/12* | (2019.01) |
| *B60L 58/16* | (2019.01) |
| *B60K 35/00* | (2006.01) |
| *G01C 21/34* | (2006.01) |
| *G01C 21/36* | (2006.01) |
| *G06N 5/04* | (2023.01) |
| *G06N 20/00* | (2019.01) |

(52) U.S. Cl.
CPC .............. *B60L 58/12* (2019.02); *B60K 35/00* (2013.01); *B60L 58/16* (2019.02); *G01C 21/3469* (2013.01); *G01C 21/3605* (2013.01); *G06N 5/04* (2013.01); *G06N 20/00* (2019.01); *B60K 2370/169* (2019.05); *B60L 2240/26* (2013.01); *B60L 2240/545* (2013.01); *B60L 2240/662* (2013.01); *B60L 2240/667* (2013.01); *B60L 2240/68* (2013.01); *B60L 2260/20* (2013.01)

(58) Field of Classification Search
CPC ...... B60L 58/12; B60L 58/16; B60L 2240/26; B60L 2240/545; B60L 2240/662; B60L 2240/667; B60L 2240/68; B60L 2260/20; G06N 20/00; G06N 5/04; B60K 35/00; B60K 2370/169; G01C 21/3469; G01C 21/3605

See application file for complete search history.

(56) References Cited

U.S. PATENT DOCUMENTS

| | | | |
|---|---|---|---|
| 8,949,629 B2 * | 2/2015 | Chakra ................ | G06F 1/28 713/300 |
| 2018/0118033 A1 * | 5/2018 | Lu ....................... | B60L 3/12 |

* cited by examiner

*Primary Examiner* — Gertrude Arthur Jeanglaude
(74) *Attorney, Agent, or Firm* — Lee, Hong, Degerman, Kang & Waimey PC

(57) ABSTRACT

A system and a method for predicting a battery consumption of an electric vehicle are disclosed. The battery consumption prediction system of the electric vehicle predicts the battery consumption considering an overall state of the electric vehicle and an external environment of the electric vehicle. The battery consumption prediction system of the electric vehicle may be associated with an artificial intelligence module, a robot, an augmented reality (AR) device, a virtual reality (VR) device, devices related to 5G services, and the like.

32 Claims, 18 Drawing Sheets

FIG. 12

| | Observations | | | | | Label | Confidence |
|---|---|---|---|---|---|---|---|
| Time | Temperature (°C) | Humidity (%) | Snow | Rain | ... Drive Speed (km/h) | Battery Consumption (Wg/km) | (Wg/km) |
| 17:15 | 28 | 30 | x | x | ... 55 | 100 | 0 |
| 18:30 | 26 | 90 | x | o | ... 35 | 150 | 0 |
| 12:00 | 32 | 30 | x | x | ... 50 | 100 | 0 |
| 9:00 | 24 | 30 | x | x | ... 45 | 110 | 0 |
| 9:05 | 24 | 30 | x | x | ... 30 | 150 | 0 |
| 7:30 | 23 | 30 | x | x | ... 50 | 100 | 0 |
| 8:45 | 24 | 30 | x | x | ... 50 | 100 | 0 |
| 18:00 | 27 | 30 | x | x | ... 60 | 80 | 0 + 1 |
| 17:30 | 5 | 30 | x | x | ... 45 | 120 | 0 |
| 13:05 | -7 | 100 | o | x | ... 20 | 250 | 0 |
| | | | | | | | |
| 17:05 | 29 | 40 | x | x | ... 70 | 70 | 0 |

# DEVICE, SYSTEM AND METHOD FOR PREDICTING BATTERY CONSUMPTION OF ELECTRIC VEHICLE

CROSS-REFERENCE TO RELATED APPLICATION(S)

Pursuant to 35 U.S.C. § 119(a), this application claims the benefit of earlier filing date and right of priority to Korean Patent Application No. 10-2019-0144802, filed on Nov. 13, 2019, the contents of which are hereby incorporated by reference herein in its entirety.

BACKGROUND OF THE INVENTION

Field of the Invention

The present disclosure relates to a device, a system and a method for predicting a battery consumption of an electric vehicle.

Discussion of the Related Art

The vehicle is one of transportation means for moving a user riding in the vehicle in a desired direction, and a representative example of the vehicle may include an automobile. In particular, the automobile requires a driving force for the movement in order to provide the user with the convenience of movement.

In a related art, the automobile used an internal combustion engine to obtain the driving force, but electric vehicles driven by electric power stored in batteries have recently emerged.

In order to know an available time or distance of the battery embedded in the electric vehicle in the related art, the related art measured a voltage or a current of the battery itself and calculated the available time or distance based on the measured voltage or current.

However, the available time or distance of the battery took no account of factors which affect the battery usage, for example, an overall state of the electric vehicle such as a driver's driving pattern, or an external environment of the electric vehicle such as weather and traffic conditions. Therefore, the available time or distance of the battery was provided inaccurately.

SUMMARY OF THE INVENTION

An object of the present disclosure is to address the above-described and other needs and/or problems.

The present disclosure provides a device, a system and a method for predicting a battery consumption of an electric vehicle considering all of information about a battery itself, information about an external environment of the electric vehicle such as weather or traffic situation, and information about an overall state of the electric vehicle such as a drive mode, the number of occupants, a weight of loaded load, etc. of the electric vehicle.

The present disclosure provides a device, a system and a method for predicting a battery consumption of an electric vehicle capable of setting and changing reliability of a predicted consumption of a battery by comparing an actual consumption and the predicted consumption of the battery.

In one aspect of the present disclosure, there is provided a battery consumption prediction device of an electric vehicle comprising a processor configured to calculate a battery consumption of the electric vehicle, wherein the processor includes a collection module configured to collect first information indicating an overall state of the electric vehicle and second information indicating an external environment of the electric vehicle and generate prediction data based on the first information and the second information, and a prediction module configured to receive the prediction data from the collection module and derive a predicted consumption of a battery.

The prediction module may be configured to obtain a difference between the predicted consumption and an actual consumption that is calculated by measuring in real time the battery of the electric vehicle, and an absolute value of the difference, provide a first feedback reducing a reliability of the predicted consumption if the absolute value exceeds a first value, and provide a second feedback increasing the reliability of the predicted consumption if the absolute value is equal to or less than the first value.

The processor may further include a learning module that is connected to be able to communicate data with each of the collection module and the prediction module. The learning module may be configured to machine-learn the first information, the second information, the predicted consumption, and the actual consumption and give the reliability to the predicted consumption according to a magnitude of the difference between the predicted consumption and the actual consumption, i.e., a magnitude of the absolute value.

The prediction module may be configured to output a consumption table that uses the prediction data as an input value and uses the predicted consumption as a result value.

The consumption table may include a first item unit into which the first information and the second information are inserted, a second item unit indicating the predicted consumption as a result of the first item unit, and a third item unit indicating the reliability of the predicted consumption displayed on the second item unit.

The reliability may be expressed as a natural number. The first feedback may be a feedback for adding '−1' to the reliability, and the second feedback may be a feedback for adding '+1' to the reliability.

The prediction module may be configured to output a consumption table that uses the prediction data as an input value and uses the predicted consumption as a result value, and add the first feedback and the second feedback accumulated on the reliability to calculate a feedback sum.

The prediction module may be configured to delete the predicted consumption corresponding to the feedback sum from the consumption table if the feedback sum is less than a second value that is set to one of −5 to −10.

The prediction module may be configured to add the predicted consumption corresponding to the feedback sum to the consumption table if the feedback sum is greater than a second value that is set to one of −5 to −1.

The first value may be set to one of 5 to 10.

The collection module may be connected to be able to communicate data with at least one of a sensing unit, a communication unit, an object detector, a driving operator, a vehicle driver, a location data generator, a navigation, and a main electronic control unit (ECU) of the electric vehicle. If a unit time or a unit distance has passed, the collection module may be configured to collect the first information and the second information from at least one of the sensing unit, the communication unit, the object detector, the driving operator, the vehicle driver, the location data generator, the navigation, and the main ECU of the electric vehicle.

The unit time may be set to one of 1 minute to 5 minutes, and the unit distance may be set to one of 1 km to 5 km.

The first information may include a drive mode, a drive speed, a number of occupants, a weight of loaded load, center of gravity, a rapid acceleration history and a rapid deceleration history of the electric vehicle, and a temperature, a usage period, an output, a capacity and a life of the battery.

The second information may include a current time, a temperature and a weather around the electric vehicle at the current time, and a traffic state of a route on which the electric vehicle is driving.

The battery consumption prediction device may further comprise an output unit configured to display a battery power level calculated based on the predicted consumption or the actual consumption and display a drivable distance of the electric vehicle based on the battery power level.

In another aspect of the present disclosure, there is provided a battery consumption prediction system of an electric vehicle comprising a collection device configured to collect first information indicating an overall state of the electric vehicle and second information indicating an external environment of the electric vehicle and generate prediction data, a prediction server configured to derive a predicted consumption of a battery based on the prediction data transmitted from the collection device, and a user equipment configured to display a result calculated by the prediction server, wherein the prediction server is configured to calculate a difference between the predicted consumption and an actual consumption of the battery of the electric vehicle and generate a feedback changing a reliability of the predicted consumption.

The collection device may include a processor configured to collect raw data of the electric vehicle as the first information, preprocess the first information, and generate the prediction data. The processor may be connected to be able to communicate data with at least one of a sensing unit, a communication unit, an object detector, a driving operator, a vehicle driver, a location data generator, a navigation, and a main electronic control unit (ECU) of the electric vehicle.

The processor may be configured to, periodically or each time the electric vehicle drives a predetermined distance, collect the raw data from at least one of the sensing unit, the communication unit, the object detector, the driving operator, the vehicle driver, the location data generator, the navigation, and the main ECU and collect the second information from an external server.

The first information may include a drive mode, a drive speed, a number of occupants, a weight of loaded load, center of gravity, a rapid acceleration history and a rapid deceleration history of the electric vehicle, and a temperature, a usage period, an output, a capacity and a life of the battery. The second information may include a current time, a temperature and a weather around the electric vehicle at the current time, and a traffic state of a route on which the electric vehicle is driving.

The prediction server may include a learning module configured to machine-learn the first information and the second information, that are factors capable of changing the predicted consumption and the actual consumption, in association with the predicted consumption and the actual consumption, and a prediction module configured to output a consumption table that uses the prediction data as an input value and uses the predicted consumption as a result value.

The prediction module may be configured to obtain a difference between the predicted consumption and the actual consumption that is calculated by measuring in real time the battery of the electric vehicle, and an absolute value of the difference, provide a first feedback reducing the reliability of the predicted consumption if the absolute value exceeds a first value, and provide a second feedback increasing the reliability of the predicted consumption if the absolute value is equal to or less than the first value.

The battery consumption prediction system may further comprise an external server configured to transmit the second information to the collection device.

In another aspect of the present disclosure, there is provided a method for predicting a battery consumption of an electric vehicle, the method comprising collecting first information and second information, preprocessing the first information and the second information to generate prediction data, deriving a predicted consumption of a battery of the electric vehicle using the prediction data as an input value, measuring in real time a battery power level of the electric vehicle and subtracting the real-time battery power level from an initial battery power level to calculate an actual consumption, obtaining a difference between the predicted consumption and the actual consumption and an absolute value of the difference, and evaluating a reliability of the predicted consumption according to a magnitude of the absolute value.

The evaluating of the reliability may comprise applying a first feedback reducing the reliability of the predicted consumption if the absolute value exceeds a first value, and applying a second feedback increasing the reliability of the predicted consumption if the absolute value is equal to or less than the first value.

The first value may be set to one of 5 to 10.

The first feedback may be a feedback for adding '−1' to the reliability, and the second feedback may be a feedback for adding '+1' to the reliability.

The deriving of the predicted consumption may comprise creating a consumption table that uses the prediction data as an input value and uses the predicted consumption as a result value, inputting the prediction data to the consumption table, outputting the predicted consumption as a result value, searching a reliability evaluation history and checking whether there is a previous reliability evaluation result corresponding to the predicted consumption output as the result value, and if the previous reliability evaluation result exists in the reliability evaluation history, giving and displaying a reliability included in the previous reliability evaluation result to the predicted consumption.

The method may further comprise, after evaluating the reliability, adding a first feedback and a second feedback accumulated on the reliability to calculate a feedback sum, and deleting the predicted consumption corresponding to the feedback sum from the consumption table if the feedback sum is less than a second value.

The second value may be set to one of −5 to −10.

The method may further comprise, after calculating the feedback sum, adding the predicted consumption corresponding to the feedback sum to the consumption table if the feedback sum is greater than the second value.

The method may further comprise, after evaluating the reliability, calculating a current battery power level of the electric vehicle based on the predicted consumption or the actual consumption, calculating a drivable distance of the electric vehicle based on the current battery power level, and displaying the drivable distance to a driver.

The method may further comprise, before collecting the first information and the second information, inputting a destination to a navigation of the electric vehicle, outputting at least one route for reaching the destination, and collecting third information about the route.

The deriving of the predicted consumption may comprise calculating a predicted battery consumption with respect to the route based on the third information, and displaying, to the driver, a total battery consumption consumed to complete the route. The third information may include a total length of the route, a type of road installed in the route, and a slope, an altitude above sea level, an altitude deviation and a terrain for each section included in the route.

The battery consumption prediction device, system, and method of the electric vehicle according to the present disclosure predict a battery consumption considering all factors that may affect the battery consumption, i.e., all of information about a battery itself, information about an external environment of the electric vehicle such as weather or traffic situation, and information about an overall state of the electric vehicle such as a drive mode, the number of occupants, a weight of loaded load, etc. of the electric vehicle, and thus can accurately predicts the actual consumption of the battery consumed while the electric vehicle is driving.

Further, the battery consumption prediction device, system, and method of the electric vehicle according to the present disclosure exclude an inaccurate predicted consumption from the learning module for deriving the predicted consumption by evaluating the reliability of the predicted consumption, and thus can provide the predicted consumption equal or similar to the actual consumption.

BRIEF DESCRIPTION OF THE DRAWINGS

The accompanying drawings, which are included to provide a further understanding of the disclosure, illustrate embodiments of the disclosure and together with the description serve to explain the principle of the disclosure.

FIG. 12 illustrates a consumption table of an electric vehicle battery according to an embodiment of the present disclosure.

DETAILED DESCRIPTION OF THE EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the disclosure, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

A. Example of Block Diagram of UE and 5G Network

Figure 1:
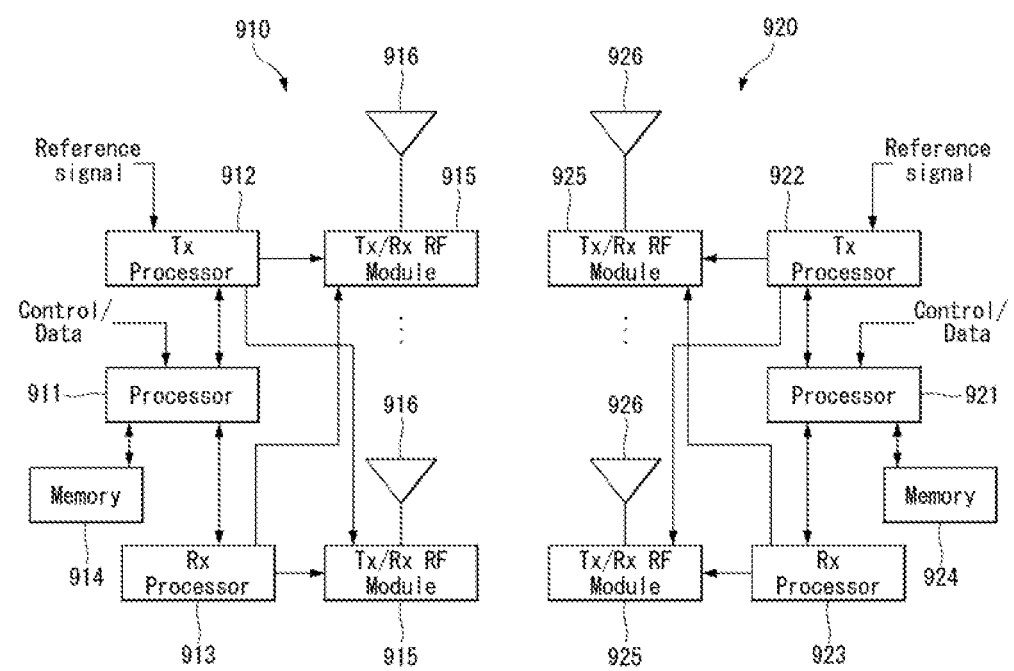
FIG. 1 is a block diagram illustrating configuration of a wireless communication system to which methods proposed in the present disclosure are applicable.

FIG. 1 is a block diagram of a wireless communication system to which methods proposed in the disclosure are applicable.

Referring to FIG. 1, a device (autonomous device) including an autonomous module is defined as a first communication device (910 of FIG. 1), and a processor 911 can perform detailed autonomous operations.

A 5G network including another vehicle communicating with the autonomous device is defined as a second communication device (920 of FIG. 1), and a processor 921 can perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, an autonomous device, or the like.

For example, a terminal or user equipment (UE) may include a vehicle, a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
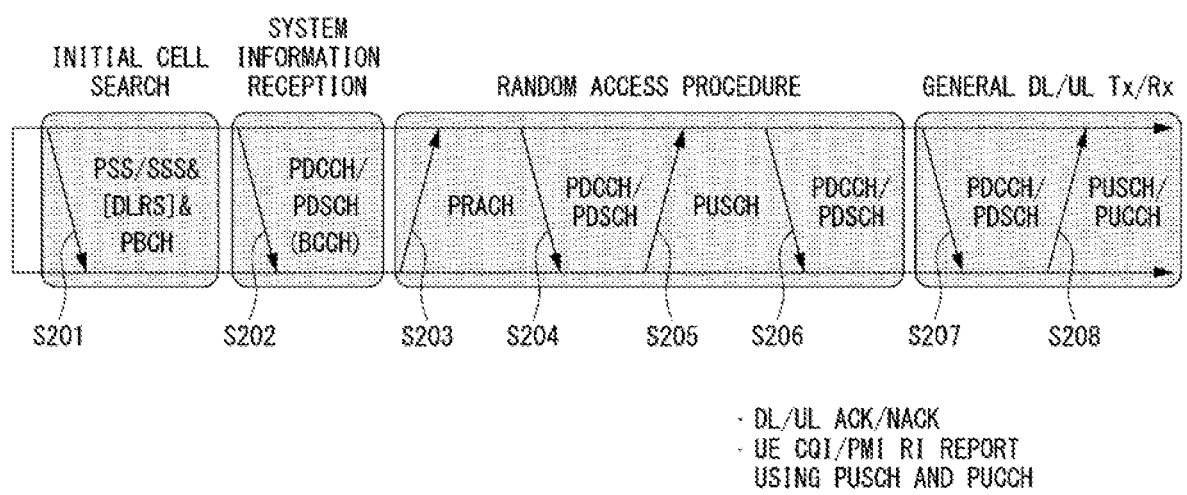
FIG. 2 illustrates an example of a signal transmission/reception method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and 5205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-S SB-ResourceS etList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-S SB-ResourceS etList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD' . Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (massive MTC)

mMTC (massive Machine Type Communication) is one of 5 G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, returning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) returning from a first frequency resource to a second frequency resource is performed in a guard period and the specific information and the response to the specific information can be transmitted/received through a narrowband (e.g., 6 resource blocks (RBs) or 1 RB).

F. Basic Operation Between Autonomous Vehicles Using 5G Communication

Figure 3:
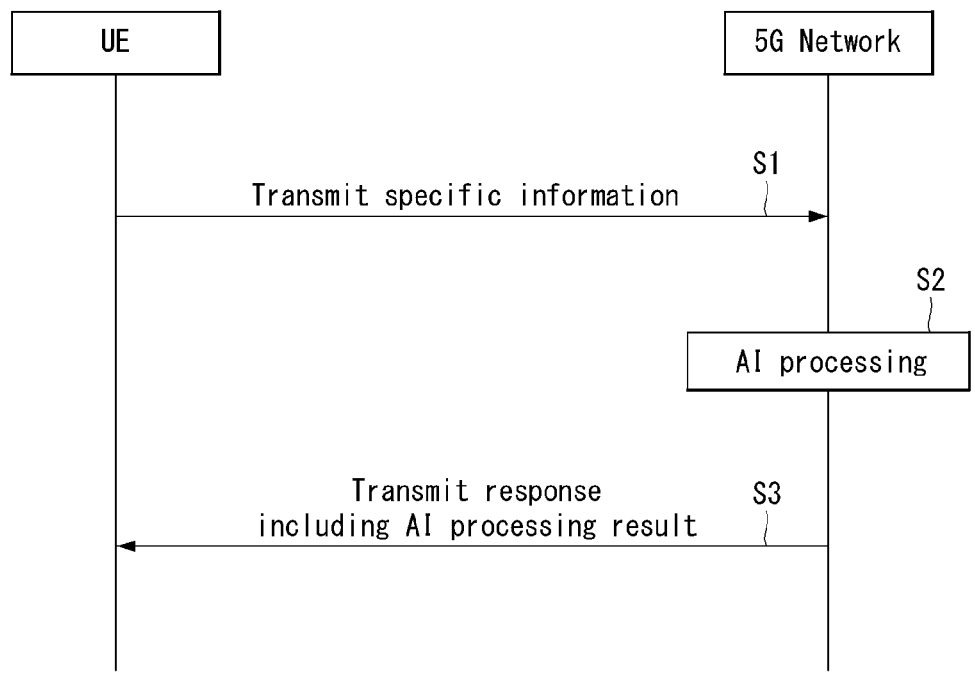
FIG. 3 illustrates an example of basic operation of a user equipment and a 5G network in a 5G communication system.

FIG. 3 shows an example of basic operations of an autonomous vehicle and a 5G network in a 5G communication system.

The autonomous vehicle transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the autonomous vehicle (S3).

G. Applied operations between autonomous vehicle and 5G network in 5G communication system Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The description of the user equipment (UE) described above can be applied to a vehicle which will be described later with reference to FIGS. 4 to 6.

H. Vehicle, i.e., User Equipment

Figure 4:
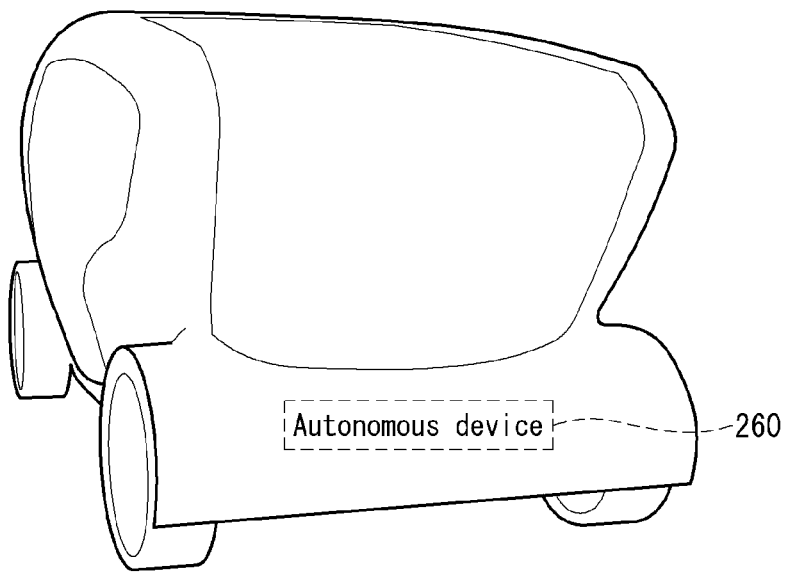
FIG. 4 illustrates a vehicle according to an embodiment of the present disclosure.
Figure 4:
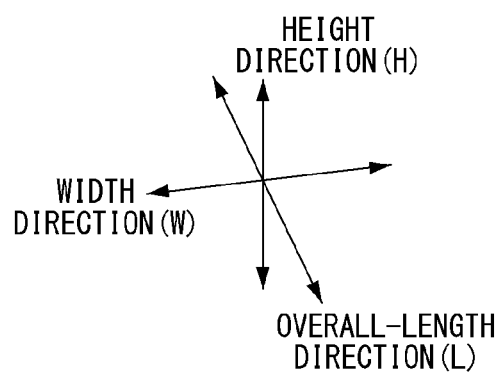

FIG. 4 illustrates a vehicle according to an embodiment of the present disclosure.

Referring to FIG. 4, a vehicle 10 according to an embodiment of the present disclosure is defined as means of transport traveling on roads or railroads. The vehicle 10 means to include a car, a train and a motorcycle. The vehicle 10 may mean to include all of an internal combustion engine vehicle having an engine as a power source, a hybrid vehicle having an engine and a motor as a power source, and an electric vehicle having an electric motor as a power source, and the like. The vehicle 10 may be a private owned vehicle. The vehicle 10 may be a shared vehicle. The vehicle 10 may be an autonomous vehicle.

The vehicle 10 according to an embodiment of the present disclosure may be configured as a vehicle, i.e., an electric vehicle driven by an electric motor. Thus, the vehicle 10 according to an embodiment of the present disclosure may be referred to as an electric vehicle 10 according to an embodiment of the present disclosure and may be designated with the same reference numerals.

I. Block Diagram of AI Device

Figure 5:
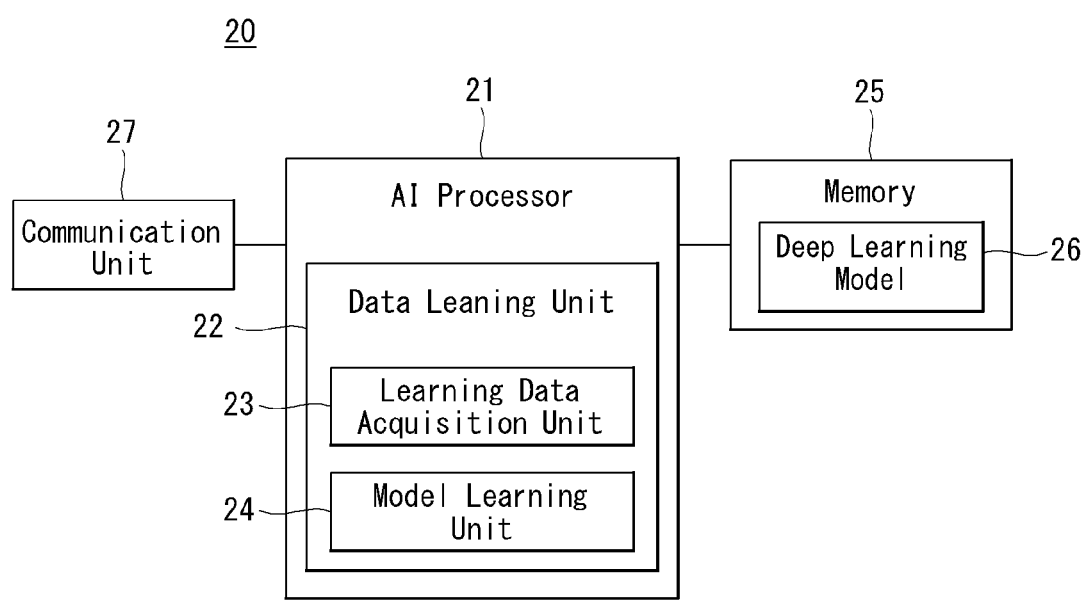
FIG. 5 is a block diagram of an AI device according to an embodiment of the present disclosure.

FIG. 5 is a block diagram of an AI device according to an embodiment of the present disclosure.

An AI device 20 may include an electronic device including an AI module that can perform AI processing, or a server including the AI module, or the like. Further, the AI device 20 may be included as at least a component of the vehicle 10 illustrated in FIG. 4 to perform at least a part of the AI processing.

The AI processing may include all operations related to the control of the vehicle 10 illustrated in FIG. 4. For example, if the vehicle 10 illustrated in FIG. 4 is an autonomous vehicle and/or an electric vehicle, the corresponding autonomous vehicle and/or electric vehicle may perform the AI processing on sensing data or acquired data to perform a processing/determination operation and a control signal generation operation. Further, the corresponding autonomous vehicle and/or electric vehicle may perform the autonomous driving control by performing AI processing on data acquired through an interaction with other electronic devices included inside the autonomous vehicle and/or the electric vehicle or other electronic devices included outside the autonomous vehicle and/or the electric vehicle.

The AI device 20 may be a client device directly using a result of the AI processing, or a device of cloud environment providing a result of the AI processing for other device.

The AI apparatus 20 may include an AI processor 21, a memory 25 and/or a communication unit 27.

The AI apparatus 20 may be a computing apparatus which may perform a neural network learning and implemented with various electronic devices such as a server, a desktop, a PC, a notebook PC, a tablet PC.

The AI processor 21 may perform a neural network learning using the program stored in the memory 25. Particularly, the AI processor 21 may perform a neural network learning for recognizing vehicle related data. Here, the neural network for recognizing the vehicle related data may be designed to simulate a brain structure of a human on a computer and may include a plurality of network nodes having a priority which simulating a neuron of human neural network. A plurality of network nodes may exchange data according to each connection relation to simulate a synaptic activity of the neuron, which the neuron exchanges a signal through a synapse. Here, the neural network may include a deep learning model which is developed from the neural network model. In the deep learning model, a plurality of network nodes may exchange data according to a convolution connection relation with being located in different layers. An example of the neural network model may include various deep learning techniques such as deep neural networks (DNN), convolutional deep neural networks (CNN), Recurrent Boltzmann Machine (RNN), Restricted Boltzmann Machine (RBM), deep belief networks (DBN), Deep Q-Network, and may be applied to a field such as computer vision, voice recognition, natural language process and voice/signal processing.

The processer that performs the functions described above may be a general-purpose processor (e.g., CPU) but an AI-dedicated processor (e.g., GPU) for an artificial intelligence learning.

The memory 25 may store various types of program and data required for an operation of the AI apparatus 20. The memory 25 may be implemented with non-volatile memory, volatile memory, flash memory, hard disk drive (HDD) or solid-state drive (SDD). The memory 25 may be accessed by the AI processor 21 and read/record/modification/deletion/update of data may be performed by the AI processor 21. In addition, the memory 25 may store a neurotic network model (e.g., deep learning model 26) which is generated through a learning algorithm for data classification/recognition according to an embodiment of the present disclosure.

The AI processor 21 may include a data learning unit 22 that learns a neurotic network for the classification/recognition. The data learning unit 22 may learn a criterion on which learning data is used to determine the classification/recognition and how to classify and recognize data using the learning data. The data learning unit 22 may obtain learning data used for learning and apply the obtained learning data to the deep learning model, and accordingly, learn the deep learning model.

The data learning unit 22 may be manufactured in at least one hardware chip shape and mounted on the AI apparatus 20. For example, the data learning unit 22 may be manufactured in hardware chip shape dedicated for the artificial intelligence (AI) or manufactured as a part of a general-purpose processor (CPU) or a graphic processing processor (GPU) and mounted on the AI apparatus 20. Furthermore, the data learning unit 22 may be implemented with a software module. In the case that the data learning unit 22 is implemented with a software module (or program module including instruction), the software module may be stored in a non-transitory computer readable media. In this case, at least one software module may be provided by an Operating System (OS) or an application.

The data learning unit 22 may include a learning data acquisition unit 23 and a model learning unit 24.

The learning data acquisition unit 23 may acquire learning data which is required for the neurotic network model for classifying and recognizing data. For example, the learning data acquisition unit 23 may obtain vehicle data and/or sample data for being inputted in the neurotic network model as learning data.

The model learning unit 24 may learn to have a determination criterion how to classify predetermined data by the neurotic network model using the obtained learning data. In this case, the model learning unit 24 may learn the neurotic network model through a supervised learning that uses at least one determination criterion among learning data. Alternatively, the model learning unit 24 may learn the learning data without supervising and learn the neurotic network model through an unsupervised learning which discovers a determination criterion. In addition, the model learning unit 24 may learn the neurotic network model through a reinforcement learning using a feedback whether a result of an assessment of situation according to learning is correct. Furthermore, the model learning unit 24 may learn the neurotic network model using a learning algorithm including an error back-propagation or a gradient decent.

When the neurotic network model is learned, the model learning unit 24 may store the learned neurotic network model in a memory. The model learning unit 24 may store learned neurotic network model in the memory of a server connected to the AI apparatus 20 in wired or wireless manner.

The data learning unit 22 may further include a learning data pre-processing unit (not shown) or a learning data selection unit (not shown) for improving an analysis result of the learning model or saving a resource or time which is required for generating a recognition model.

The learning data pre-processing unit may pre-process obtained data such that the obtained data is used for learning for an assessment of situation. For example, the learning data pre-processing unit may process the obtained data in a preconfigured format such that the model learning unit 24 uses the learning data obtained for learning an image recognition.

In addition, the learning data selection unit may select the data required for learning between the learning data obtained in the learning data acquisition unit 23 or the learning data pre-processed in the pre-processing unit. The selected learning data may be provided to the model learning unit 24. For example, the learning data selection unit may detect a specific area in the image obtained through the camera and select only the data for the object included in the specific area as the learning data.

Furthermore, the data learning unit 22 may further include a model evaluation unit (not shown) for improving the analysis result of the learning model.

The model evaluation unit may input evaluation data in the neurotic network model, and in the case that the analysis result fails to satisfy a predetermined level, make the data learning unit 22 learn the neurotic network model again. In this case, the evaluation data may be predefined data for evaluating a recognition model. As an example, in the case that the number of evaluation data or the ratio in which the analysis result is not clear exceeds a preconfigured threshold value in the analysis result of the recognition model which is learned for the evaluation data, the model evaluation unit may evaluate that the analysis result fails to satisfy the predetermined level.

The communication unit 27 may the AI processing result by the AI processor 21 to an external electronic device.

Here, the external electronic device may be defined as an automatic driving vehicle. In addition, the AI apparatus 20 may be defined as another vehicle or 5G network that communicates with the automatic driving vehicle or an automatic driving module mounted vehicle. The AI apparatus 20 may be implemented with being functionally embedded in the automatic driving module provided in a vehicle. In addition, 5G network may include a server or module that performs a control in relation to an automatic driving.

The AI apparatus 20 shown in FIG. 5 is described by functionally dividing into the AI processor 21, the memory 25 and the communication unit 27, but the elements described above may be integrated in a module and called an AI module.

Figure 6:
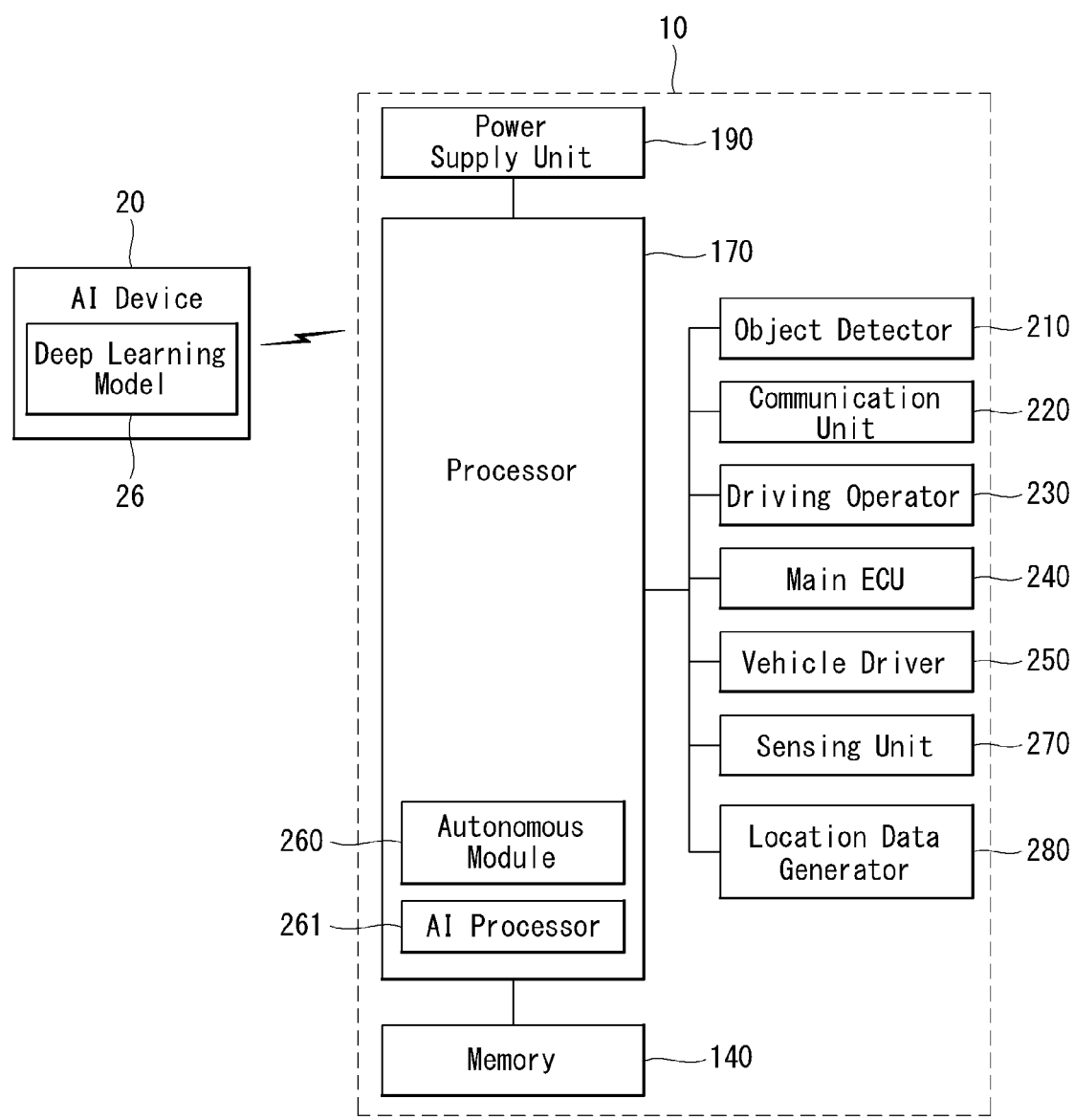
FIG. 6 illustrates a system, in which a vehicle is associated with an AI device, in accordance with an embodiment of the present disclosure.

FIG. 6 illustrates a system, in which an autonomous vehicle is associated with an AI device, in accordance with an embodiment of the present disclosure.

Referring to FIG. 6, the vehicle 10 may transmit data requiring the AI processing to the AI device 20 through a communication unit, and the AI device 20 including the deep learning model 26 may send, to the vehicle 10, a result of the AI processing obtained using the deep learning model 26. The AI device 20 may refer to the description with reference to FIG. 5.

The vehicle 10 may include a memory 140, a processor 170 and a power supply unit 190, and the processor 170 may include an autonomous module 260 and an AI processor 261. The vehicle 10 may further include an interface which is connected wiredly or wirelessly to at least one electronic device included in the vehicle 10 and can exchange data necessary for an autonomous driving control. The at least one electronic device connected through the interface may include an object detector 210, a communication unit 220, a driving operator 230, a main electronic control unit (ECU) 240, a vehicle driver 250, a sensing unit 270, and a location data generator 280.

The interface may be configured as at least one of a communication module, a terminal, a pin, a cable, a port, a circuit, an element, or a device.

The memory 140 is electrically connected to the processor 170. The memory 140 can store basic data about a unit, control data for operation control of a unit, and input/output data. The memory 140 can store data processed in the processor 170. The memory 140 may be configured hardware-wise as at least one of a ROM, a RAM, an EPROM, a flash drive, or a hard drive. The memory 140 can store various types of data for overall operation of the vehicle 10, such as a program for processing or control of the processor 170. The memory 140 may be integrated with the processor 170. According to an embodiment, the memory 140 may be categorized as a subcomponent of the processor 170.

The power supply unit 190 can provide power to the vehicle 10. The power supply unit 190 may receive power from a power source (e.g., a battery) included in the vehicle 10 and supply power to each unit of the vehicle 10. The power supply unit 190 may operate in response to a control signal received from the main ECU 240. The power supply unit 190 may include a switched-mode power supply (SMPS).

The processor 170 may be electrically connected to the memory 140, a position data generation unit 280 and the power supply unit 190 and exchange signals with them. The processor 170 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units for executing other functions.

The processor 170 may be driven by power provided from the power supply unit 190. The processor 170 may receive data, process data, generate signals, and provide signals in a state in which power is supplied from the power supply unit 190.

The processor 170 may receive information from other electronic devices of the vehicle 10 via the interface. The processor 170 may provide control signals to other electronic devices of the vehicle 10 via the interface.

The vehicle 10 may include at least one printed circuit board (PCB). The memory 140, the interface, the power supply unit 190 and the processor 170 may be electrically connected to the PCB.

Other electronic devices of the vehicle 10 which are connected to the interface, the AI processor 261, and the autonomous module 260 will be described in more detail below.

The object detector 210 may generate information about objects outside the vehicle 10. The AI processor 261 may apply a neural network model to data acquired through the object detector 210 to generate at least one of information on presence or absence of an object, location information of the object, distance information of the vehicle and the object, or information on a relative speed between the vehicle and the object.

The object detector 210 may include at least one sensor which can detect an object outside the vehicle 10. The sensor may include at least one of a camera, a radar, a lidar, an ultrasonic sensor, or an infrared sensor. The object detector 210 may provide data about an object generated based on a sensing signal generated in the sensor to at least one electronic device included in the vehicle.

The vehicle 10 may transmit data acquired through the at least one sensor to the AI device 20 through the communication unit 220, and the AI device 20 may transmit, to the vehicle 10, AI processing data generated by applying the neural network model 26 to the transmitted data. The vehicle 10 may recognize information about an object detected based on received AI processing data, and the autonomous module 260 may perform an autonomous driving control operation using the recognized information.

The communication unit 220 may exchange signals with devices located outside the vehicle 10. The communication device 220 may exchange signals with at least one of infrastructures (e.g., a server, a broadcasting station, etc.), other vehicles, or terminals. The communication unit 220 may include at least one of a transmission antenna, a reception antenna, a radio frequency (RF) circuit capable of implementing various communication protocols, or an RF element in order to perform communication.

The AI processor 261 may apply the neural network model to data acquired through the object detector 210 to generate at least one of information on presence or absence of an object, location information of the object, distance information of the vehicle and the object, or information on a relative speed between the vehicle and the object.

The driving operator 230 is a device which receives a user input for driving. In a manual mode, the vehicle 10 may drive based on a signal provided by the driving operator 230. The driving operator 230 may include a steering input device (e.g., a steering wheel), an acceleration input device (e.g., an accelerator pedal), and a brake input device (e.g., a brake pedal).

In an autonomous driving mode, the AI processor 261 may generate an input signal of the driving operator 230 in response to a signal for controlling a movement of the vehicle according to a driving plan generated through the autonomous module 260.

The vehicle 10 may transmit data necessary for control of the driving operator 230 to the AI device 20 through the communication unit 220, and the AI device 20 may transmit, to the vehicle 10, AI processing data generated by applying the neural network model 26 to the transmitted data. The vehicle 10 may use the input signal of the driving operator 230 to control the movement of the vehicle based on the received AI processing data.

The main ECU 240 can control overall operation of at least one electronic device included in the vehicle 10.

The vehicle driver 250 is a device which electrically controls various vehicle driving devices of the vehicle 10. The vehicle driver 250 may include a power train driving control device, a chassis driving control device, a door/window driving control device, a safety device driving control device, a lamp driving control device, and an air-conditioner driving control device. The power train driving control device may include a power source driving control device and a transmission driving control device. The chassis driving control device may include a steering driving control device, a brake driving control device, and a suspension driving control device. The safety device driving control device may include a safety belt driving control device for safety belt control.

The vehicle driver 250 includes at least one electronic control device (e.g., a control electronic control unit (ECU)).

The vehicle driver 250 can control a power train, a steering device, and a brake device based on signals received from the autonomous module 260. The signals received from the autonomous module 260 may be driving control signals generated by applying the neural network model to vehicle related data in the AI processor 261. The driving control signals may be signals received from the AI device 20 through the communication unit 220.

The sensing unit 270 may sense a state of the vehicle. The sensing unit 270 may include at least one of an inertial measurement unit (IMU) sensor, a collision sensor, a wheel sensor, a speed sensor, an inclination sensor, a weight sensor, a heading sensor, a position module, a vehicle forward/reverse sensor, a battery sensor, a fuel sensor, a tire sensor, a steering sensor, a temperature sensor, a humidity sensor, an ultrasonic sensor, an illumination sensor, or a pedal position sensor. The IMU sensor may include at least one of an acceleration sensor, a gyro sensor, or a magnetic sensor. According to embodiments of the present disclosure, sensor data may include information related to a gaze direction of a driver, information related to a gesture that the driver lowers or raises a sun visor, and voice information related to a conversation between the driver and another person in the vehicle.

The AI processor 261 may apply the neural network model to sensing data generated in at least one sensor to generate state data of the vehicle. AI processing data generated using the neural network model may include vehicle pose data, vehicle motion data, vehicle yaw data, vehicle roll data, vehicle pitch data, vehicle collision data, vehicle direction data, vehicle angle data, vehicle speed data, vehicle acceleration data, vehicle inclination data, vehicle forward/reverse data, vehicle weight data, battery data, fuel data, tire pressure data, vehicle internal temperature data, vehicle internal humidity data, steering wheel rotation angle data, vehicle outside illumination data, pressure data applied to an accelerator pedal, and pressure data applied to a brake pedal, and the like. According to embodiments of the present disclosure, if a process of determining whether there is a change in the driver's gaze is performed in the vehicle 10, the AI processing data may include information related to a driver's state (e.g., a current gaze direction and a previous gaze direction of the driver, a location of the sun visor, etc.).

The autonomous module 260 may generate a driving control signal based on AI-processed vehicle state data. According to embodiments of the present disclosure, if a process of determining whether there is a change in the driver's gaze is performed by the AI processor 261, the AI driving control signal may include information determined in relation to change in the driver's gaze.

The vehicle 10 may transmit data acquired through the at least one sensor to the AI device 20 through the communication unit 220, and the AI device 20 may transmit, to the vehicle 10, AI processing data generated by applying the neural network model 26 to the transmitted data.

The location data generator 280 may generate location data of the vehicle 10. The location data generator 280 can include at least one of a global positioning system (GPS) and a differential global positioning system (DGPS).

The AI processor 261 can generate more accurate location data of the vehicle by applying the neural network model to location data generated in at least one location data generating device.

According to an embodiment, the AI processor 261 may perform a deep learning operation based on at least one of an inertial measurement unit (IMU) of the sensing unit 270 and a camera image of the object detector 210 and correct location data based on the generated AI processing data.

The vehicle 10 may transmit location data acquired from the location data generator 280 to the AI device 20 through the communication unit 220, and the AI device 20 may transmit, to the vehicle 10, AI processing data generated by applying the neural network model 26 to the received location data.

The vehicle 10 may include an internal communication system 50. A plurality of electronic devices included in the vehicle 10 may exchange signals by means of the internal communication system 50. The signals may include data. The internal communication system 50 may use at least one communication protocol (e.g., CAN, LIN, FlexRay, MOST, Ethernet, etc.).

The autonomous module 260 may generate a path for autonomous driving based on acquired data and generate a driving plan for driving along the generated path.

The autonomous module 260 may implement at least one advanced driver assistance system (ADAS) function. The ADAS may implement at least one of an adaptive cruise control (ACC) system, an autonomous emergency braking (AEB) system, a forward collision warning (FCW) system, a lane keeping assist (LKA) system, a lane change assist (LCA) system, a target following assist (TFA) system, a blind spot detection (BSD) system, an adaptive high beam assist (HBA) system, an auto parking system (APS), a PD collision warning system, a traffic sign recognition (TSR) system, a traffic sign assist (TSA) system, a night vision (NV) system, a driver status monitoring (DSM) system, or a traffic jam assist (TJA) system The AI processor 261 may send, to the autonomous module 260, a control signal capable of performing at least one of the aforementioned ADAS functions by applying the neural network model to information received from at least one sensor included in the vehicle, traffic related information received from an external device, and information received from other vehicles communicating with the vehicle.

The vehicle 10 may transmit at least one data for performing the ADAS functions to the AI device 20 through the communication unit 220, and the AI device 20 may send, to the vehicle 10, the control signal capable of performing the ADAS functions by applying the neural network model to the received data.

The autonomous module 260 may acquire state information of a driver and/or state information of the vehicle through the AI processor 261 and perform an operation of switching from an autonomous driving mode to a manual driving mode or an operation of switching from the manual driving mode to the autonomous driving mode based on the acquired information.

The vehicle 10 may use AI processing data for passenger assistance for driving control. For example, as described above, states of a driver and a passenger can be checked through at least one sensor included in the vehicle.

Further, the vehicle 10 can recognize a voice signal of a driver or a passenger through the AI processor 261, perform a voice processing operation, and perform a voice synthesis operation.

So far, 5G communication necessary to implement the vehicle control method according to an embodiment of the present disclosure, performing AI processing using the 5G communication, and transmitting/receiving a result of AI processing have been schematically described.

Figure 7:
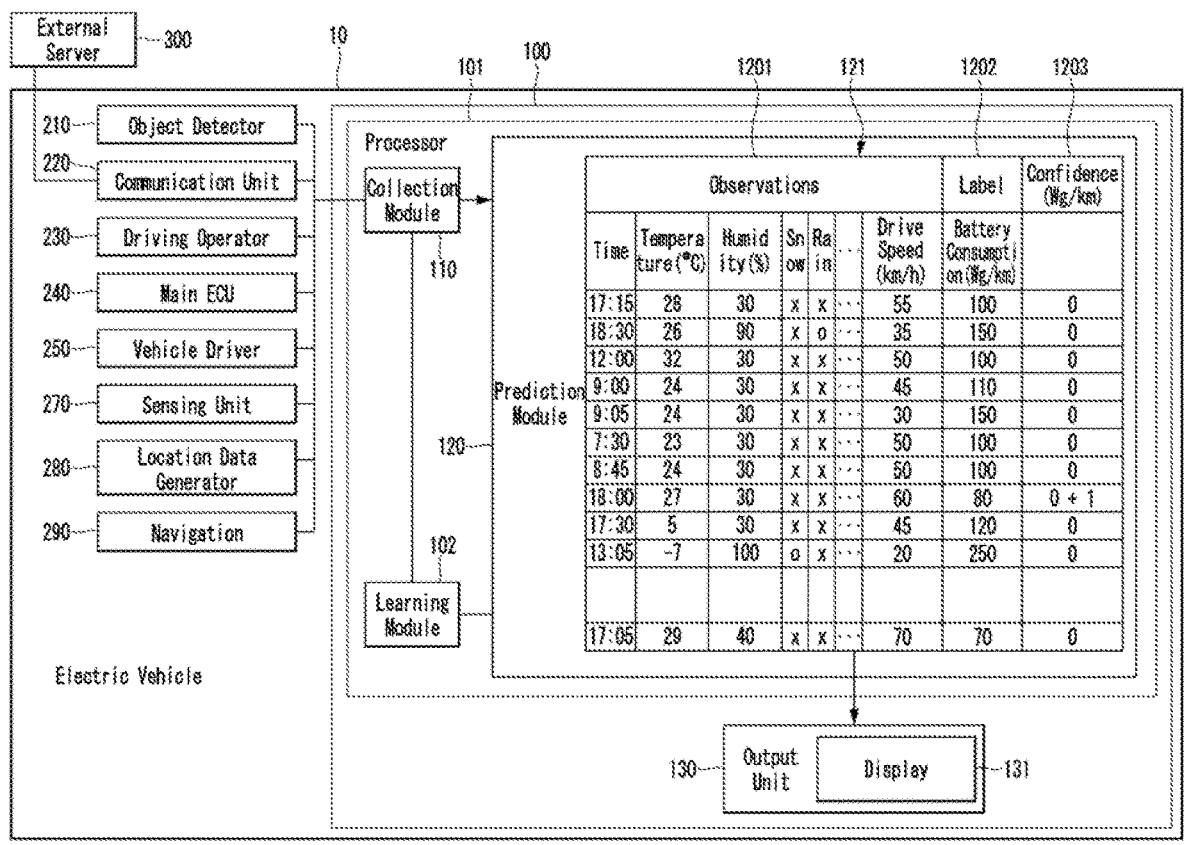
FIG. 7 is a block diagram illustrating configuration of a battery consumption prediction device of an electric vehicle according to a first embodiment of the present disclosure.
Figure 8:
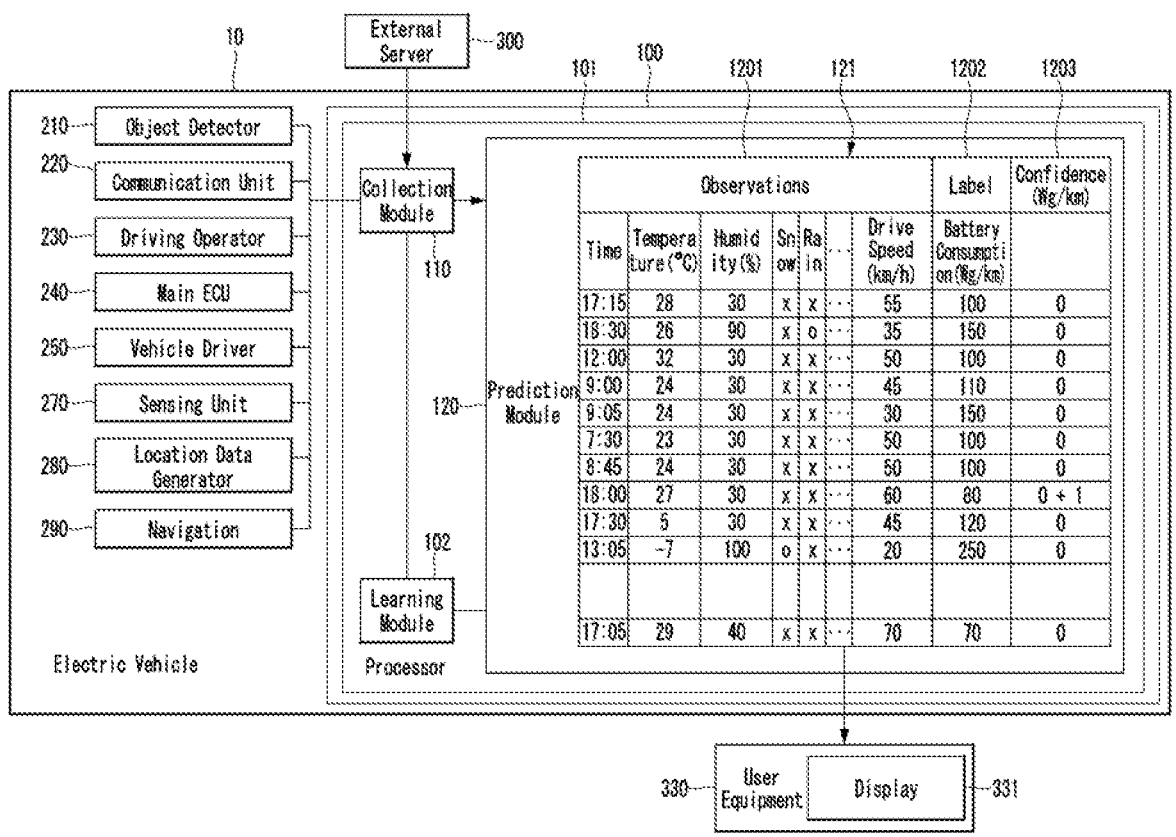
FIG. 8 is a block diagram illustrating configuration of a battery consumption prediction device of an electric vehicle according to a second embodiment of the present disclosure.
Figure 9:
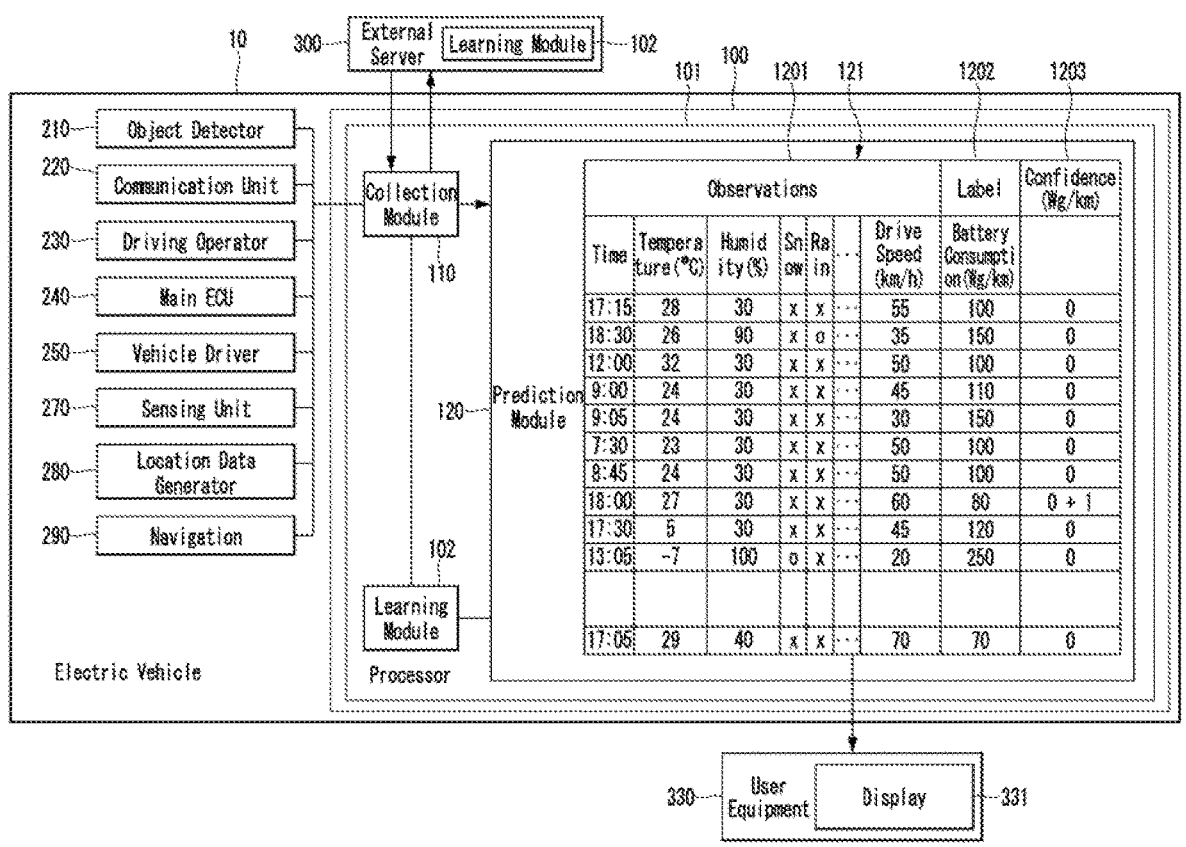
FIG. 9 is a block diagram illustrating configuration of a battery consumption prediction device of an electric vehicle according to a third embodiment of the present disclosure.

With reference to FIGS. 7 to 9, a battery consumption prediction device 100 of an electric vehicle according to the present disclosure is described below. Before a detailed description, the vehicle 10 according to the present disclosure may be configured as an electric vehicle, and the vehicle 10 and the electric vehicle may be described using the same reference numeral. In the following description, the vehicle 10 and the electric vehicle 10 may be used interchangeably.

However, the vehicle according to the present disclosure described below is described by way of example using an electric vehicle driven using a battery, in which power is stored, as a power source for convenience of explanation.

A vehicle 10 or an electric vehicle 10 according to the present disclosure may include an AI device 20 described above or may be configured as part of the AI device 20.

In this case, although not shown in FIGS. 7 to 9, a battery consumption prediction device 100 according to the present disclosure may include an AI processor 21, a memory 25, and a communication 27 that are illustrated in FIG. 5. The battery consumption prediction device 100 according to the present disclosure may include the AI device 20 that is configured such that the AI processor 21, the memory 25, and the communication 27 are integrated into one module. If the battery consumption prediction device 100 is configured independently of the AI device 20, the battery consumption prediction device 100 may be configured to communicate data with the AI device 20.

That is, if the battery consumption prediction device 100 according to the present disclosure does not directly include the AI device 20, the AI device 20 may be included in an external server 300 illustrated in FIGS. 7 to 9, or may be independently configured separately from the external server 300.

Even if the external server 300 and the AI device 20 are configured separately from each other as described above, the external server 300 and the AI device 20 are configured to communicate data with each other.

FIG. 7 is a block diagram illustrating configuration of a battery consumption prediction device of an electric vehicle according to a first embodiment of the present disclosure. A battery consumption prediction device 100 according to the present disclosure may include a processor 101 and an output unit 130, and the processor 101 may further include a collection module 110, a prediction module 120, and a learning module 102.

More specifically, FIG. 7 illustrates an exemplary first embodiment of a battery consumption prediction device according to the present disclosure, and the battery consumption prediction device according to the exemplary first embodiment may be configured unlike configuration illustrated in FIG. 7.

That is, FIG. 7 illustrates that the battery consumption prediction device 100 included in the electric vehicle 10 includes one processor 101, and the processor 101 includes all the collection module 110, the prediction module 120, and the learning module 102, by way of example. This is merely an exemplary configuration that is changeable.

For example, as illustrated in FIG. 8, the output unit 130 may not be included in the battery consumption prediction device 100 and may be implemented as a user equipment 330. Here, the user equipment 330 may include all of mobile devices capable of wireless communication, and may be implemented as a mobile device, for example, a smart phone. In this case, a display 131 included in the output unit 130 may correspond to a display 331 included in the user equipment 330 and may equally display information or data displayed on the output unit 130.

FIG. 8 is a block diagram illustrating configuration of a battery consumption prediction device of an electric vehicle according to a second embodiment of the present disclosure.

As illustrated in FIG. 8, a learning module 102 may not be included in a battery consumption prediction device 100 and may be implemented to be included in an external server 300. The learning module 102 is implemented as an AI device or AI module capable of machine learning, and thus may be configured as part of the battery consumption prediction device 100 mounted in an electric vehicle 10. However, if the learning module 102 is configured to provide a learning result to the battery consumption prediction device 100 and be able to control a prediction module 120 of the battery consumption prediction device 100 according to the learning result, the learning module 102 may be implemented to be included in the external server 300 or implemented as a separate AI device or AI module independent of the external server 300.

After all, the battery consumption prediction device 100 and the learning module 102 have to be connected to be able to communicate data with each other. FIG. 9 is a block diagram illustrating configuration of a battery consumption prediction device of an electric vehicle according to a third embodiment of the present disclosure.

With reference to FIGS. 7 to 9, the processor 101 according to an embodiment of the present disclosure predicts and calculates a battery consumption of the electric vehicle 10 and controls the output unit 130 or the user equipment 330 so that the processor 101 outputs a result of calculation to the driver.

The collection module 110 included in the processor 101 collects first information indicating an overall state of the electric vehicle 10 and second information indicating an external environment of the electric vehicle 10 and preprocesses the first information and the second information to generate prediction data.

Thus, the collection module 110 is connected to be able to communicate data with an object detector 210, a communication unit 220, a driving operator 230, a main ECU 240, a vehicle driver 250, a sensing unit 270, a location data generator 280, and a navigation 290 of the electric vehicle 10. The collection module 110 according to the first embodiment illustrated in FIG. 7 communicates data with the external server 300 via the communication unit 220 and receives the second information.

Here, the first information includes a drive mode, a drive speed, the number of occupants, a weight of loaded load, the center of gravity, a rapid acceleration history, and a rapid deceleration history of the electric vehicle 10, and a temperature, a usage period, an output, a capacity, and a life of the battery.

Further, the second information includes a current time in a time zone in which the electric vehicle 10 is located, temperature and weather around the electric vehicle 10 at a current time, and a traffic state of a route on which the electric vehicle 10 is driving.

On the other hand, as in the second embodiment illustrated in FIG. 8 and the third embodiment illustrated in FIG. 9, the collection module 110 may be connected to the external server 300 so that the collection module 110 can directly communicate with the external server 300.

The collection module 110 collects raw data from the object detector 210, the communication unit 220, the driving operator 230, the main ECU 240, the vehicle driver 250, the sensing unit 270, the location data generator 280, and the navigation 290 and recognizes the raw data as the first information indicating an overall state of the electric vehicle 10.

The first information may include various setting values of the electric vehicle 10 in addition to the raw data. A variety of sensing data measured by the sensing unit 270 may also be collected by the collection module 110 and classified as the first information.

The collection module 110 collects, from the external server 300, the second information that is external environment information of the electric vehicle 10.

The second information is not information indicating the state of the electric vehicle 10 like the first information, but is a factor affecting the electric vehicle 10 when the electric vehicle 10 drives. Therefore, the second information is determined as a factor that may affect the battery consumption of the electric vehicle 10. The determined factor that may affect the battery consumption of the electric vehicle 10 is collected by the collection module 110, and is classified as second information.

The collection module 110 is configured to collect the first information and the second information each time a specific unit time or a specific unit distance has passed. That is, the collection module 110 collects the first information and the second information periodically or each time the electric vehicle 10 drives a predetermined distance. This is to ensure the validity of data constituting the first information and the second information and reduce an amount of computation required for the collection module 110 to preprocess the raw data, because a large amount of data is generated inside and outside the electric vehicle 10 every moment.

Accordingly, the collection module 110 according to the first to third embodiments of the present disclosure may be configured such that a unit time is set to one time interval of 1 minute to 5 minutes and a unit distance is set to one distance interval of 1 km to 5 km. For example, the collection module 110 according to the first embodiment of the present disclosure may be configured to collect the first information and the second information at intervals of two minutes or at travel intervals of 1 km from the starting up of the electric vehicle 10. However, the setting values of the unit time and the unit distance are merely an example and can be variously changed.

The collection module 110 classifies the collected raw data as the first information and the second information, preprocesses the first information and the second information to convert these information into input values of the learning module 102 and the prediction module 120, and generates prediction data.

The prediction module 120 according to the first to third embodiments of the present disclosure receives the prediction data from the collection module 110, derives a predicted consumption of the battery, and obtains a difference between the predicted consumption of the battery and an actual consumption of the battery measured in real time. Further, the prediction module 120 obtains an absolute value of the difference between the predicted consumption and the actual consumption in order to determine a magnitude of the difference.

The prediction module 120 is connected to be able to communicate data with the learning module 102 capable of performing machine learning. The learning module 102 may learn the first information, the second information, the predicted consumption, and the actual consumption, derive associated features between them, and determine what factor greatly affects the battery consumption. The learning module 102 gives reliability to the predicted consumption derived by the prediction module 120 according to the learning result.

The prediction module 120 may be configured to verify the reliability that the learning module 102 gives to the predicted consumption. To this end, the prediction module 120 determines whether the absolute value of the difference between the predicted consumption and the actual consumption exceeds a predetermined magnitude. That is, the prediction module 120 provides a first feedback reducing the reliability of the predicted consumption if the absolute value exceeds a first value, and provides a second feedback increasing the reliability of the predicted consumption if the absolute value is equal to or less than the first value.

In the present disclosure, the first value may be set to one of, for example, 5 to 10. The reliability that the learning module 102 gives to the predicted consumption may be expressed as a natural number. For example, the first feedback may be configured as a feedback for adding '−1' to the reliability, and the second feedback may be configured as a feedback for adding '+1' to the reliability.

In order to give the reliability to the predicted consumption, when the learning module 102 learns the first information, the second information, the predicted consumption, and the actual consumption, the learning module 102 is implemented as a deep learning module that is an example of the machine learning, and thus can extract feature values associated between the first information, the second information, the predicted consumption, and the actual consumption, give a weight value to each feature, and check a factor that greatly affects the predicted consumption or the actual consumption of the battery. The learning module 102 may additionally give a weight value to a change in the factor and predict a battery consumption.

Accordingly, as described above, the learning module 102 itself may be implemented as the AI device 20 in order to perform the machine learning or the deep learning, and may be included in the external server 300 or implemented as a separate device from the external server 300. The learning module 102 may be implemented as the AI module and included in the battery consumption prediction device 100 according to the present disclosure.

With reference to FIGS. 7 to 9, the prediction module 120 according to the first to third embodiments of the present disclosure may be configured to output a consumption table 121 that uses the prediction data as an input value and uses the predicted consumption as a result value.

The consumption table 121 includes a first item unit 1201 into which the first information and the second information are inserted, a second item unit 1202 that outputs a result of the first item unit 1201 and displays a predicted consumption, and a third item unit 1203 that indicates a reliability value of the predicted consumption displayed on the second item unit 1202.

The consumption table 121 has a function role including a predetermined algorithm embedded therein in order to calculate the predicted battery consumption, and may be created by the prediction module 120. However, the consumption table 121 may be a consumption table that is pre-stored in the prediction module 120 by a manager or a producer.

The learning module 102 constructs a data set using values input to the consumption table 121 or prediction data to be input to the consumption table 121 as input values, in order to learn the first information, the second information, the predicted consumption, and the actual consumption.

If the learning module 102 is implemented as a deep learning module, values input to the consumption table 121 can derive which item most affects the predicted consumption and the actual consumption of the battery among items input to the first item unit 1201 of the consumption table 121 while passing through multiple layers including a plurality of nodes.

The consumption table 121 illustrated in FIGS. 7 to 9 is described in more detail. The prediction module 120 inserts prediction data, that is classified as the first information and the second information in the collection module 110, into each item included in the first item unit 1201 of the consumption table 121.

The first item unit 1201 includes items to which information indicating the overall state of the electric vehicle 10 included in the first information is input, and items to which information indicating an external environment of the electric vehicle 10 is input. Therefore, prediction data, that is classified as the first information and the second information in the collection module 110, is quickly and easily input to corresponding items or related items by the prediction module 120.

In the consumption table 121 illustrated in FIGS. 7 to 9, for example, the first item unit 1201 includes both items to which the second information indicating the external environment of the electric vehicle 10 such as temperature and humidity is input, and items to which the first information indicating the overall state of the electric vehicle 10 such as a drive speed is input. Since the items have been classified in the consumption table 121, each prediction data is immediately input to the corresponding item.

Afterwards, the prediction module 120 processes the prediction data input to the first item unit 1201 as a function and outputs a result of processing to the second item unit 1202.

In the consumption table 121 illustrated in FIGS. 7 to 9, the second item unit 1202 indicates a predicted battery consumption as a result of processing prediction data input per a specific unit time (e.g., at intervals of 5 minutes) in the first item unit 1201.

For example, as a result of processing prediction data input to the first item unit 1201 at 09:00 as a function, the second item unit 1202 outputs 110 Wh/km as the predicted battery consumption. Further, as a result of processing prediction data input to the first item unit 1201 at 09:05, which is 5 minutes later, as a function, the second item unit 1202 outputs 150 Wh/km as the predicted battery consumption.

The learning module 102 recognizes the predicted consumption indicated in the second item unit 1202 and recognizes the first information and second information causing the output of the corresponding predicted consumption. Afterwards, the learning module 102 searches a history of the consumption table 121 included in the prediction module 120 or a reliability evaluation history of a specific predicted consumption reserved by the learning module 102 itself.

If a result of evaluating before a history search result exists, the learning module 102 may evaluate a reliability of a corresponding predicted consumption that is recently derived based on the first information and the second information included in a history, and equally give a previously evaluated reliability to the corresponding predicted consumption.

A reliability value that the learning module 102 calculates per the predicted consumption may be expressed as a natural number, and is indicated in the third item unit 1203 of the consumption table 121 illustrated in FIGS. 7 to 9.

The prediction module 120 verifies the reliability that the learning module 102 gives to a specific predicted consumption. To this end, after the learning module 102 gives the reliability to the specific predicted consumption, the prediction module 120 compares the specific predicted consumption with an actual consumption, obtains a difference between them, obtains an absolute value of the difference, and determines a magnitude of the difference. If the difference between the specific predicted consumption and the actual consumption is large, the prediction module 120 generates a feedback reducing the reliability and applies the feedback to the existing given reliability. Further, if the difference is not large, the prediction module 120 generates a feedback increasing the reliability and applies the feedback to the existing given reliability.

A method of verifying, by the prediction module 120, the reliability is described in more detail as follows. First, the collection module 110 periodically measures a battery power level and collects raw data of a real-time battery power level. The prediction module 120 compares data of an initial battery power level measured upon the vehicle starting-up with a battery power level that is periodically measured by the collection module 110, and derives an actual battery consumption.

Afterwards, the prediction module 120 compares a specific predicted consumption, to which the learning module 102 gives the reliability, with the actual consumption and obtains a difference between them. In this instance, the prediction module 120 obtains an absolute value of the difference. If a magnitude of the absolute value exceeds a first value, the prediction module 120 generates a first feedback reducing reliability of the specific predicted consumption that is a comparison target, and applies the first feedback to the reliability of the specific predicted consumption.

On the other hand, if the magnitude of the absolute value is equal to or less than the first value, the prediction module 120 generates a second feedback increasing the reliability of the specific predicted consumption that is the comparison target, and applies the second feedback to the reliability of the specific predicted consumption.

In this case, the first value may be set to one of, for example, 5 to 10. For example, the first feedback may be set to a feedback for adding '−1' to the reliability value, and the second feedback may be set to a feedback for adding '+1' to the reliability value. However, these values are merely exemplary values, and other values may be used for the first value, the first feedback, and the second feedback.

A method of verifying reliability by the prediction module 120 according to the first to third embodiments of the present disclosure using the consumption table 121 illustrated in FIGS. 7 to 9 as an example under the assumption that each value has been set as described above for convenience of explanation is described below.

In the consumption table 121 illustrated in FIGS. 7 to 9, a predicted consumption that is output as a result of processing prediction data input to the first item unit 1201 at 18:00 is 80 Wh/km.

The prediction module 120 can recognize that an actual consumption at 18:00 is 82 Wh/km through data of a battery power level measured by the collection module 110 at 18:00. In this case, the prediction module 120 can obtain an absolute value '2' of a difference between 80 Wh/km and 82 Wh/km.

In this case, if a first value is 5, a difference between the predicted consumption and the actual consumption is 2 and does not exceed the first value '5'. Based on this, the prediction module 120 can generate a second feedback for adding '+1' to a reliability value of the predicted consumption '80 Wh/km' and apply the second feedback to the reliability value of the predicted consumption '80 Wh/km'.

The third item unit 1203 of the consumption table 121 illustrated in FIGS. 7 to 9 can check that the reliability value of the predicted consumption '80 Wh/km' at 18:00 increased by 1.

On the contrary, the prediction module 120 can recognize that an actual consumption at 18:00 was 92 Wh/km through data of a battery power level measured by the collection module 110 at 18:00. In this case, the prediction module 120 can obtain an absolute value '12' of a difference between 80 Wh/km and 92 Wh/km.

In this case, if the first value is 10, a difference between the predicted consumption and the actual consumption is 12 and exceeds the first value '10'. Based on this, the prediction module 120 can generate a first feedback for adding '−1' to the reliability value of the predicted consumption '80 Wh/km' and apply the first feedback to the reliability value of the predicted consumption '80 Wh/km'.

The first feedback and the second feedback are directly indicated in the third item unit 1203, and thus the learning module 102 can also recognize the feedback applied to the reliability value.

The prediction module 120 according to the first to third embodiments of the present disclosure can add the feedbacks accumulated on the specific predicted consumption through such a reliability verification function and can determine whether the specific predicted consumption is reflected in the consumption table 121.

That is, if a predetermined number of feedbacks are applied to the reliability value through the repeated comparison between the specific predicted consumption and the actual consumption, the prediction module 120 adds the feedbacks that are accumulatively applied to the reliability of the specific predicted consumption, and calculate a sum of the feedbacks. If the feedback sum is less than a second value, the prediction module 120 deletes the specific predicted consumption from the consumption table 121. On the contrary, if the feedback sum is greater than the second value, the prediction module 120 may add or fix the specific predicted consumption to the consumption table 121.

In this case, the second value may be set to one of, for example, −5 to −10. However, this value is merely an example, and other values may be used for the second value. For example, the second value may be set to −1 to −5.

If the operation of the prediction module 120 that predicts 80 Wh/km as a predicted consumption at 18:00 and measures 92 Wh/km as an actual consumption at 18:00 has been repeated and accumulated at least ten times, and the second value is set to −5, a sum of feedbacks applied to a reliability value of the predicted consumption 80 Wh/km is −10 and is less than the second value.

Based on this, the prediction module 120 may determine that the reliability of the predicted consumption 80 Wh/km at 18:00 is very low, and delete the predicted consumption 80 Wh/km at 18:00 from the consumption table 121.

On the contrary, if the operation of the prediction module 120 that predicts 80 Wh/km as a predicted consumption at 18:00 and measures 82 Wh/km as an actual consumption at 18:00 has been repeated and accumulated at least ten times, and the second value is set to −1, a sum of feedbacks applied to a reliability value of the predicted consumption 80 Wh/km is +10 and is greater than the second value.

In this case, the prediction module 120 may determine that the reliability of the predicted consumption 80 Wh/km at 18:00 is very high, add the predicted consumption 80 Wh/km at 18:00 to the consumption table 121, and utilize the first information and the second information deriving the predicted consumption 80 Wh/km as a reference if similar prediction data occurs later.

That is, the prediction module 120 according to the present disclosure adds the first and second feedbacks accumulated on the reliability value of the specific predicted consumption, calculates a sum of the feedbacks, verifies the reliability value, and at the same time deletes the specific predicted consumption from the consumption table 121 if it is determined that the reliability of the specific predicted consumption is low. As described above, the prediction module 120 has a function capable of autonomously revising the consumption table 121 in addition to the reliability verification.

Further, the prediction module 120 according to the present disclosure can calculate a battery power level based on the predicted consumption or the actual consumption, calculate a drivable distance of the electric vehicle 10 based on the calculated battery power level, output the drivable distance through the output unit 130 or the user equipment 330, and display the drivable distance to the driver.

That is, the output unit 130 or the user equipment 330 can display information about the drivable distance and the battery power level provided by the prediction module 120 via a GUI including numbers, letters, symbols, and figures on the displays 131 and 331.

Accordingly, the battery consumption prediction device 100 of the electric vehicle 10 according to the present disclosure calculates the battery usage or the battery consumption by reflecting information about the overall internal state and the external environment of the electric vehicle 10, and thus very accurately predicts the battery consumption compared to the related art and provides it to the driver. Hence, the driver has greater convenience in formulating driving plans and using the electric vehicle.

A battery consumption prediction system 200 of an electric vehicle according to the present disclosure is described in detail below with reference to FIGS. 10 and 11. Structures and components of the battery consumption prediction system 200 according to the present disclosure that are identical or equivalent to the battery consumption prediction device 100 described above are designated with the same reference numerals, and a further description may be briefly made or may be entirely omitted.

Figure 10:
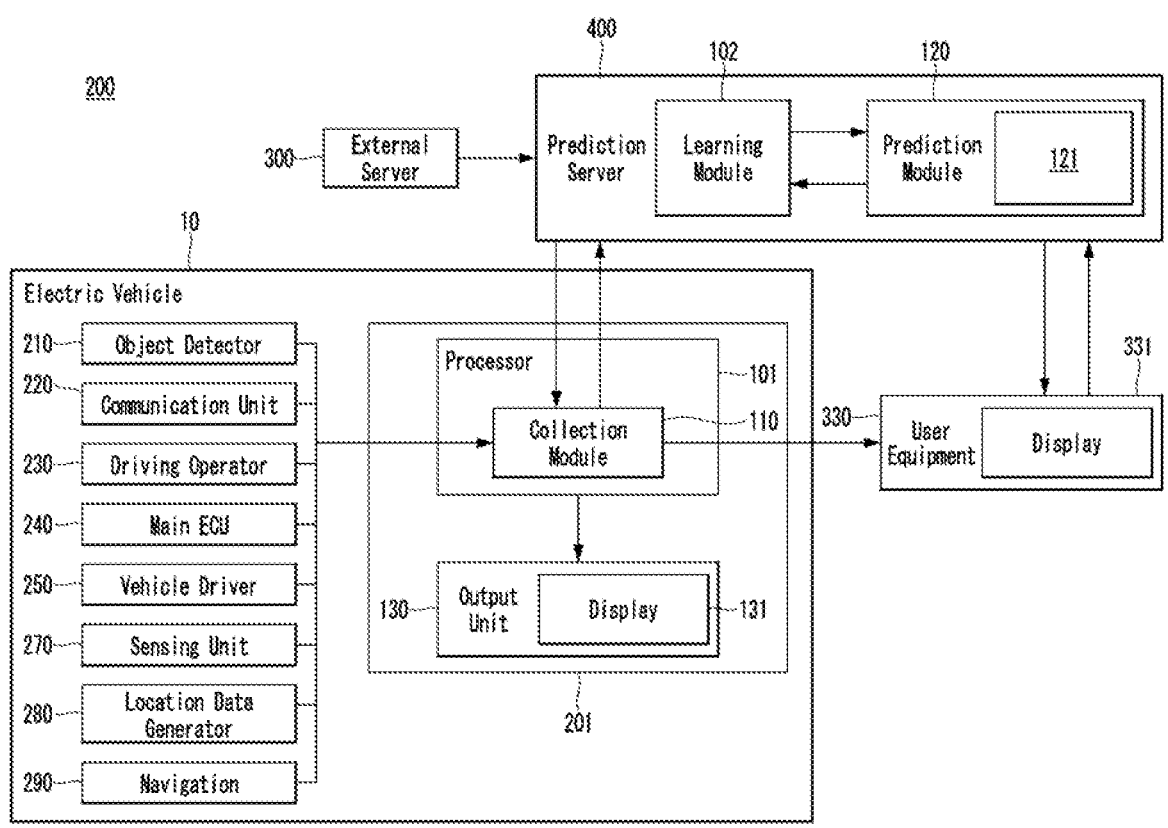
FIG. 10 is a block diagram illustrating configuration of a battery consumption prediction system of an electric vehicle according to a first embodiment of the present disclosure.
Figure 11:
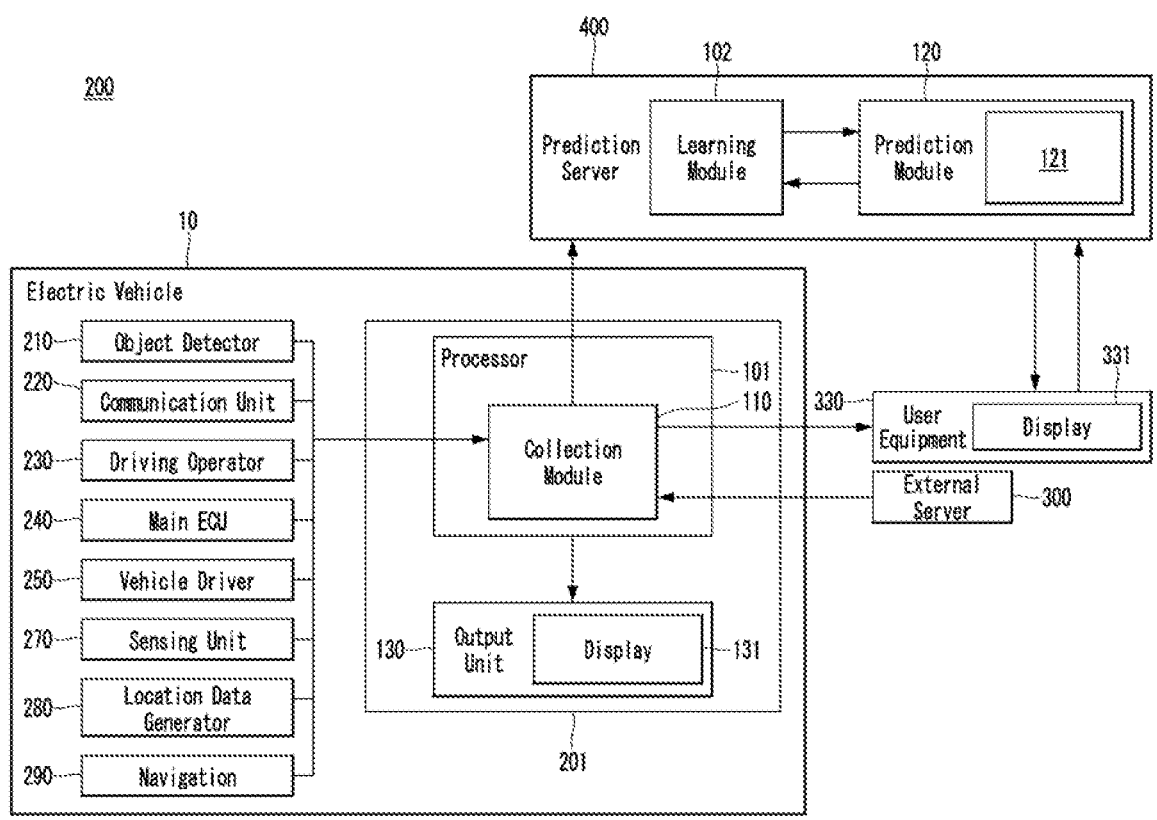
FIG. 11 is a block diagram illustrating configuration of a battery consumption prediction system of an electric vehicle according to a second embodiment of the present disclosure.

FIG. 10 is a block diagram illustrating configuration of a battery consumption prediction system of an electric vehicle according to a first embodiment of the present disclosure. FIG. 11 is a block diagram illustrating configuration of a battery consumption prediction system of an electric vehicle according to a second embodiment of the present disclosure.

A battery consumption prediction system 200 of an electric vehicle according to the present disclosure includes a collection device 201, a prediction server 400, and a user equipment 330.

The collection device 201 collects first information indicating an overall internal state of the electric vehicle 10 and/or second information indicating an external environment of the electric vehicle 10 and generates prediction data. The collection device 201 may include a processor 101 in order to collect and preprocess raw data corresponding to the first information and/or the second information.

The processor 101 may autonomously include a collection module 110 therein in order to separate the collection and the preprocessing of the raw data, but is not limited thereto. The raw data collected by the collection module 110 may go through the preprocessing in the processor 101 and may be converted into prediction data.

In the present embodiment, the processor 101 is connected to at least one of a sensing unit, a communication unit, an object detector, a driving operator, a vehicle driver, a location data generator, a navigation, and a main ECU of the electric vehicle 10 so that the processor 101 can communicate data with them.

The prediction server 400 receives the prediction data from the collection device 201 and derives a predicted battery consumption of the electric vehicle 10. Since the prediction server 400 has functions corresponding to the prediction module 120 of the above-described battery consumption prediction device 100, the prediction server 400 has functions of calculating a difference between a predicted consumption and an actual consumption of the battery and generating a feedback changing reliability of the predicted consumption.

However, the prediction server 400 according to the present embodiment additionally has the function of the collection device 201 and may collect the second information from an external server 300 and autonomously preprocess the second information to generate prediction data.

Accordingly, the battery consumption prediction system 200 according to the first embodiment may be configured to directly receive and process the second information from the external server 300 instead that the collection device 201 collects the second information from the external server 300. However, the prediction server 400 does not need to have the collection function and the preprocessing function of raw data. As in a battery consumption prediction system 200 according to the second embodiment illustrated in FIG. 11, the collection module 110 may be configured to be wholly responsible for the collection of raw data in terms of convenience of system facilities.

A user equipment 330 is configured to be able to display the predicted consumption, the actual consumption, a battery power level, and a drivable distance calculated by the prediction server 400.

The prediction server 400 included in the battery consumption prediction system 200 according to the first embodiment and the prediction server 400 included in the battery consumption prediction system 200 according to the second embodiment each include a learning module 102 and a prediction module 120, and the learning module 102 and the prediction module 120 according to these embodiments correspond to the learning module 102 and the prediction module 120 included in the battery consumption prediction device 100.

Accordingly, the prediction module 120 according to the present embodiment may output a consumption table 121 that uses prediction data generated by converting raw data as an input value and uses the predicted consumption as a result value. Further, the learning module 102 according to the present embodiment may learn the first information and the second information that are factors capable of changing the predicted consumption and the actual consumption, and may learn associated features between the learned first information and second information, the predicted consumption, and the actual consumption.

With reference to FIG. 12, the consumption table 121 is described in more detail. FIG. 12 illustrates a consumption table according to an embodiment of the present disclosure.

The consumption table 121 includes a first item unit 1201 into which the first information and the second information are inserted, a second item unit 1202 that outputs a result of the first item unit 1201 and displays a predicted consumption, and a third item unit 1203 that indicates a reliability value of the predicted consumption displayed on the second item unit 1202.

In the first item unit 1201, first information including data of a drive mode, a drive speed, the number of occupants, a weight of loaded load, the center of gravity, a rapid acceleration history, and a rapid deceleration history of the electric vehicle, and a temperature, a usage period, an output, a capacity, and a life of the battery, and second information including a current time, temperature and weather around the electric vehicle at a current time, and a traffic state of a route, on which the electric vehicle is driving, are inserted in rows and columns of a table. That is, in the first item unit 1201, items of a drive mode, a drive speed, the number of occupants, a weight of loaded load, the center of gravity, a rapid acceleration history, and a rapid deceleration history of the electric vehicle, a temperature, a usage period, an output, a capacity, and a life of the battery, a current time, temperature and weather around the electric vehicle at a current time, a traffic state of a route, on which the electric vehicle is driving, etc. are inserted into the rows, and data of each item is converted into numbers and is inserted into the columns at predetermined time intervals.

The second item unit 1202 calculates data inserted into the first item unit 1201 and indicates a predicted consumption of the battery. That is, the second item unit 1202 calculates numerical data, that is inserted for each item of the first item unit 1201 in the columns at a specific time, by a predetermined function and outputs a calculated result.

The third item unit 1203 indicates, as a numerical value, reliability indicating how close the predicted consumption output to the second item unit 1202 is to the actual consumption.

Since the battery consumption prediction system 200 according to the present embodiment can receive prediction data from the respective electric vehicles 10 at the center and provide a predicted consumption of the battery to each electric vehicle 10, each electric vehicle 10 does not need to include the learning module 102 and the prediction module 120. Hence, the present disclosure can reduce the individual production cost of the electric vehicles 10 and reduce the overall system equipment cost because the prediction server 400 installed at the center is unified and easy to manage and maintain.

A method for predicting a battery consumption of an electric vehicle according to the present disclosure is described in detail below with reference to FIGS. 13 to 18. In a description of a method for predicting a battery consumption of an electric vehicle according to an embodiment of the present disclosure, structures and components that are identical or equivalent to the battery consumption prediction device 100 described above are designated with the same reference numerals, and a further description may be briefly made or may be entirely omitted.

Figure 13:
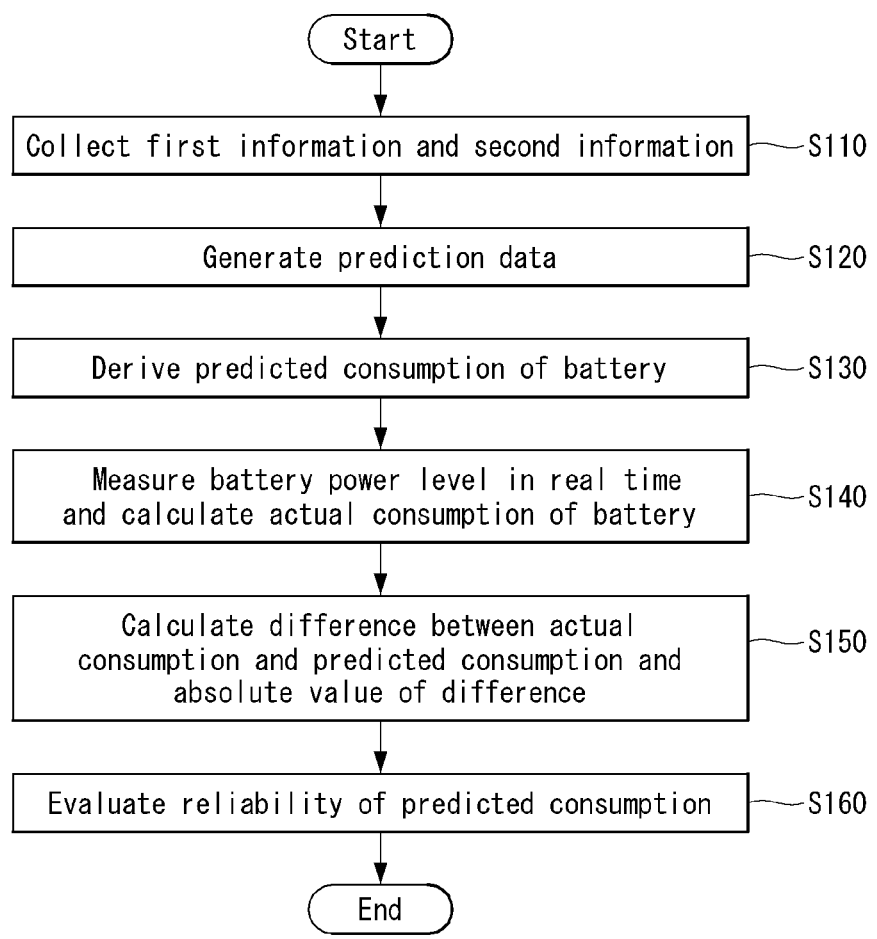
FIG. 13 is a flow chart illustrating a method for predicting a battery consumption of an electric vehicle according to an embodiment of the present disclosure.

FIG. 13 is a flow chart illustrating a method for predicting a battery consumption of an electric vehicle according to an embodiment of the present disclosure.

First, a driver gets on an electric vehicle 10 and starts it, and thus can provide power to various equipments and units mounted on the electric vehicle 10. The electric vehicle 10 is in a state capable of starting by starting.

Next, as illustrated in FIG. 13, if the electric vehicle 10 starts the driving, a collection module 110 collects first information from the electric vehicle 10 and collects second information from an external server 300 each time a unit time or a unit distance has passed in S110.

Next, the collection module 110 preprocesses the first information and the second information to generate prediction data in S120. A prediction module 120 derives a predicted consumption of a battery of the electric vehicle 10 using the prediction data received from the collection module 110 as an input value in S130.

The collection module 110 collects in real time data measuring a battery power level of the electric vehicle 10 and transmits it to the prediction module 120. The prediction module 120 calculates an actual consumption by subtracting a battery power level upon the measurement from a battery power level that has charged upon the starting, in S140.

Next, the prediction module 120 obtains a difference between the actual consumption and the predicted consumption and an absolute value of the difference in S150 and evaluates or verifies reliability of the predicted consumption according to a magnitude of the absolute value in S160.

Figure 14:
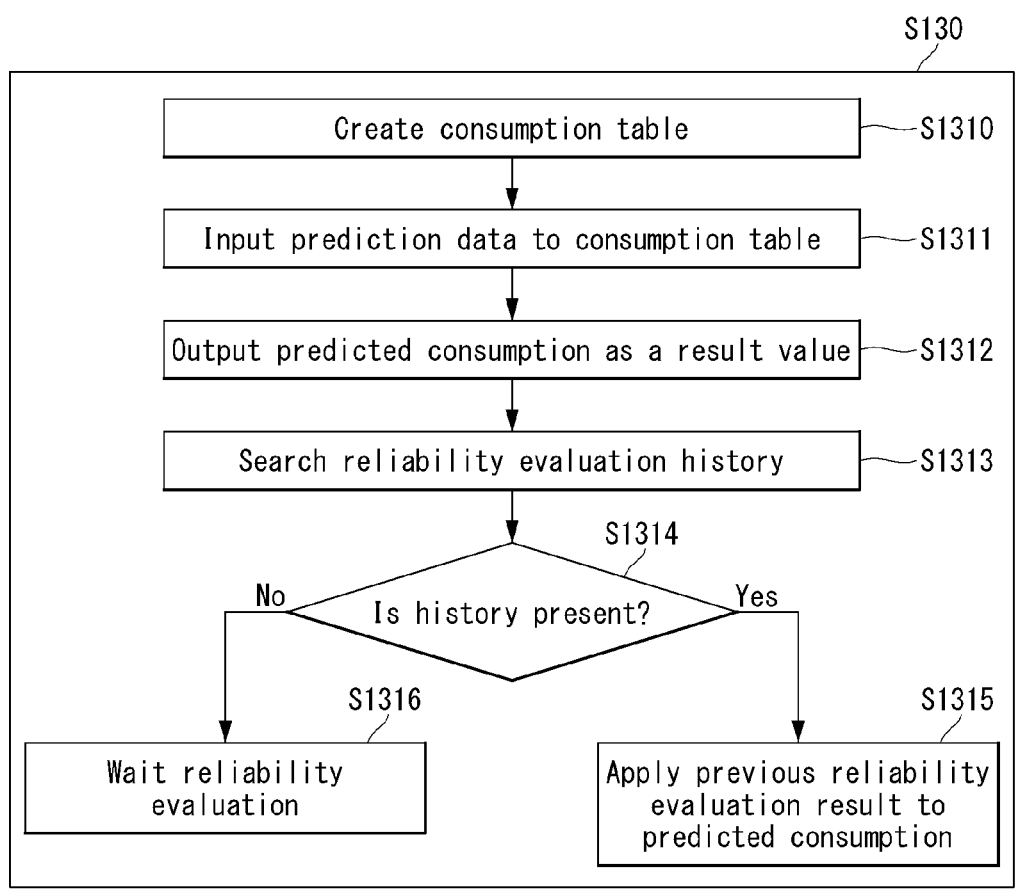
FIG. 14 is a flow chart illustrating a method for deriving a predicted battery consumption according to an embodiment of the present disclosure.

With reference to FIG. 14, the step S130 is described in more detail as follows. FIG. 14 is a flow chart illustrating a method for deriving a predicted battery consumption according to an embodiment of the present disclosure.

As illustrated in FIG. 14, in the step S130, the prediction module 120 creates a consumption table 121 that uses the prediction data as an input value and uses the predicted consumption as a result value in S1310. The consumption table 121 includes a first item unit 1201 to which the prediction data is input, a second item unit 1202 that outputs the predicted consumption, and a third item unit 1203 that indicates reliability of the predicted consumption.

The prediction data received from the collection module 110 is input to the first item unit 1201 of the consumption table 121 by the prediction module 120 in S1311.

The predicted consumption as the result value is output to the second item unit 1202 by a function included in the consumption table 121 in S1312. The function processing is performed by the prediction module 120.

A learning module 102 checks prediction data about the output predicted consumption, searches a record and a history in which the learning module 102 evaluates reliability of the predicted consumption, or a record and a history in which the prediction module 120 calculates the predicted consumption so far, and searches whether data generated in the same conditions as current prediction data exists in the history in S1313.

If there is a previous reliability evaluation result or a record previously calculating a predicted consumption in S1314, a reliability previously given to the corresponding predicted consumption is given to the corresponding predicted consumption and is indicated in the third item unit 1203 in S1315. If there is no previous reliability evaluation result or no record previously calculating a predicted consumption in S1314, the prediction module 120 repeatedly calculates the predicted consumption and waits to accumulate feedbacks of the reliability of the corresponding predicted consumption in S1316.

Figure 15:
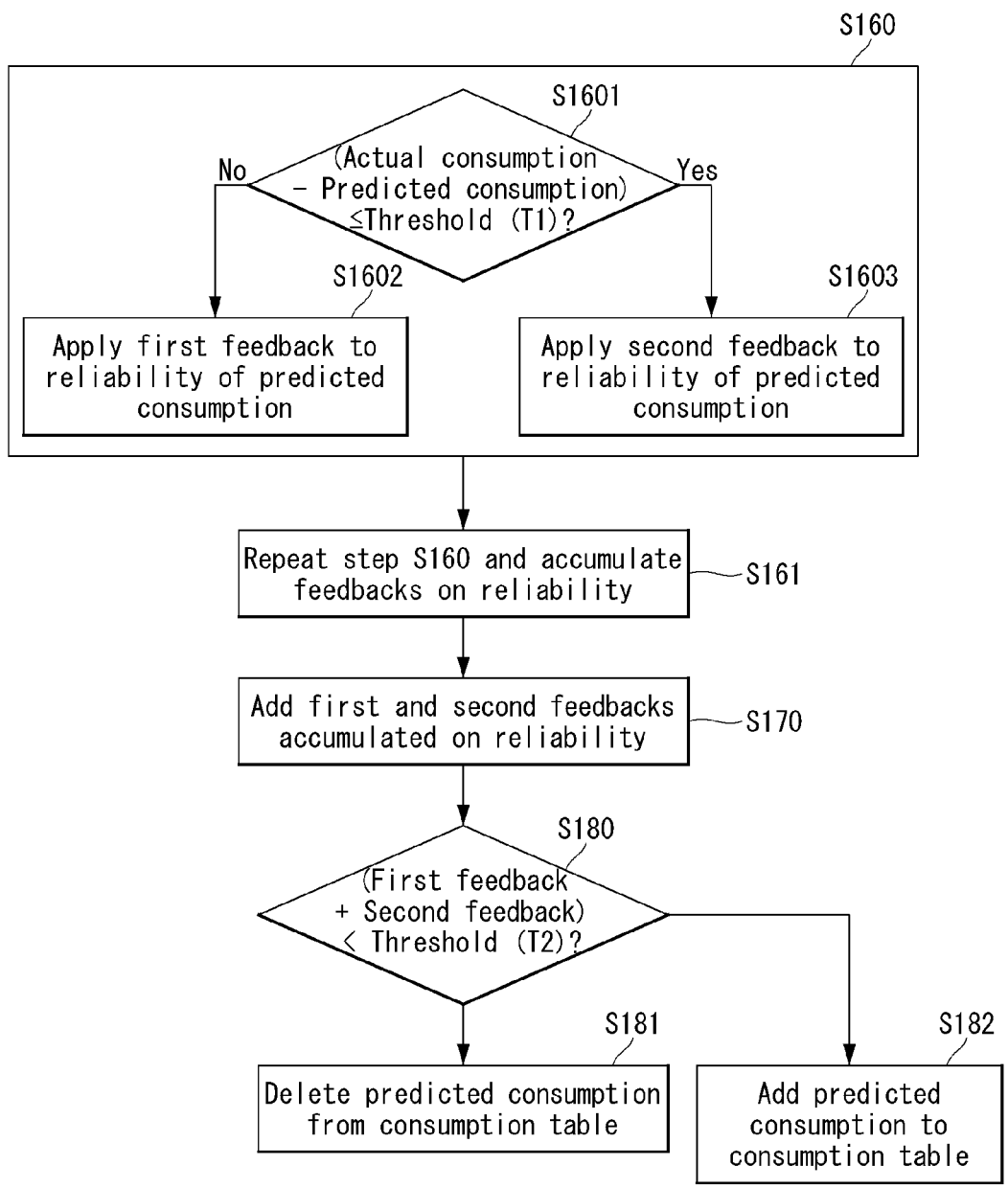
FIG. 15 is a flow chart illustrating a method for evaluating reliability of a predicted battery consumption according to an embodiment of the present disclosure.
Figure 16:
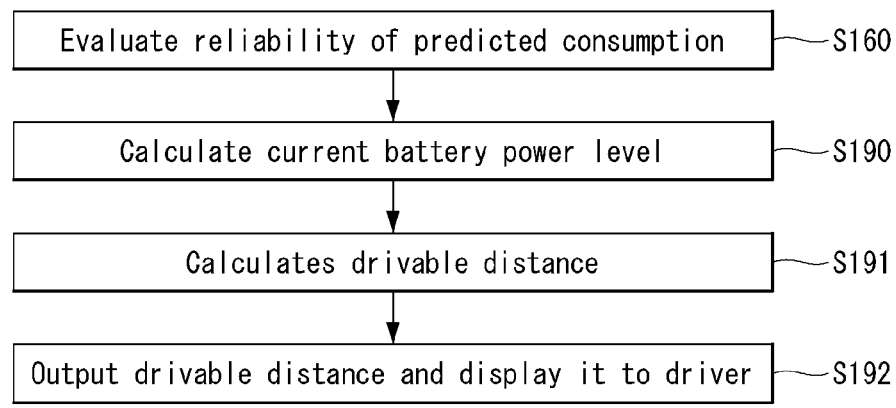
FIG. 16 is a flow chart illustrating a method for displaying a drivable distance according to an embodiment of the present disclosure.

With reference to FIG. 15, the step S160 is described in more detail as follows. FIG. 15 is a flow chart illustrating a method for evaluating reliability of a predicted consumption according to an embodiment of the present disclosure.

As illustrated in FIG. 15, in the step S160, the prediction module 120 compares a specific predicted consumption, to which the reliability is given, with the actual consumption and obtains a difference between them and an absolute value of the difference. In this instance, if a magnitude of the absolute value exceeds a first value T1 in S1601, the prediction module 120 generates a first feedback reducing reliability of the specific predicted consumption that is a comparison target, and applies the first feedback to the reliability of the specific predicted consumption in S1602.

For example, the first feedback may be set to a feedback for adding '−1' to the reliability, and the reliability may be expressed as a natural number. Further, the first value may be set to one of, for example, 5 to 10.

If the magnitude of the absolute value is equal to or less than the first value T1 in S1601, the prediction module 120 generates a second feedback increasing the reliability of the specific predicted consumption and applies the second feedback to the reliability of the specific predicted consumption in S1603.

For example, the second feedback may be set to a feedback for adding '+1' to the reliability.

The following example is described with reference to the consumption table 121 illustrated in FIGS. 7 to 9 and FIG. 12.

In the consumption table 121 illustrated in FIGS. 7 to 9 and FIG. 12, a predicted consumption that is output as a result of processing prediction data input to the first item unit 1201 at 18:00 is 80 Wh/km.

The prediction module 120 can recognize that an actual consumption at 18:00 is 82 Wh/km through data of a battery power level measured by the collection module 110 at 18:00. In this case, the prediction module 120 can obtain an absolute value '2' of a difference between 80 Wh/km and 82 Wh/km.

In this case, if the first value is 5, a difference between the predicted consumption and the actual consumption is 2 and does not exceed the first value '5'. Based on this, the prediction module 120 can generate a second feedback for adding '+1' to a reliability value of the predicted consumption '80 Wh/km' and apply the second feedback to the reliability value of the predicted consumption '80 Wh/km'.

Afterwards, the prediction module 120 may repeat the step S160 including the steps S1601, S1602 and S1603. If the step S160 is repeatedly performed predetermined times and feedbacks of the reliability of the specific predicted consumption are accumulated in S161, the prediction module 120 adds the first and second feedbacks accumulated on the corresponding reliability and calculates a sum of the feedbacks in S170.

If the feedback sum is less than a second value T2 in S180, the prediction module 120 deletes a predicted consumption corresponding to the feedback sum from the consumption table 121 in S181. In this case, the second value T2 may be set to one of, for example, −5 to −10.

If the feedback sum is greater than the second value T2 in S180, the prediction module 120 adds a predicted consumption corresponding to the feedback sum to the consumption table 121 in S182.

For example, if the operation of the prediction module 120 that predicts 80 Wh/km as a predicted consumption at 18:00 and measures 82 Wh/km as an actual consumption at 18:00 has been repeated and accumulated at least ten times, and the second value is set to −1, a sum of feedbacks applied to a reliability value of the predicted consumption 80 Wh/km is +10 and is greater than the second value.

In this instance, the prediction module 120 may determine that the reliability of the predicted consumption 80 Wh/km at 18:00 is very high, add the predicted consumption 80 Wh/km at 18:00 to the consumption table 121, and utilize the first information and the second information deriving the predicted consumption 80 Wh/km as a reference if similar prediction data occurs later.

Figure 17:
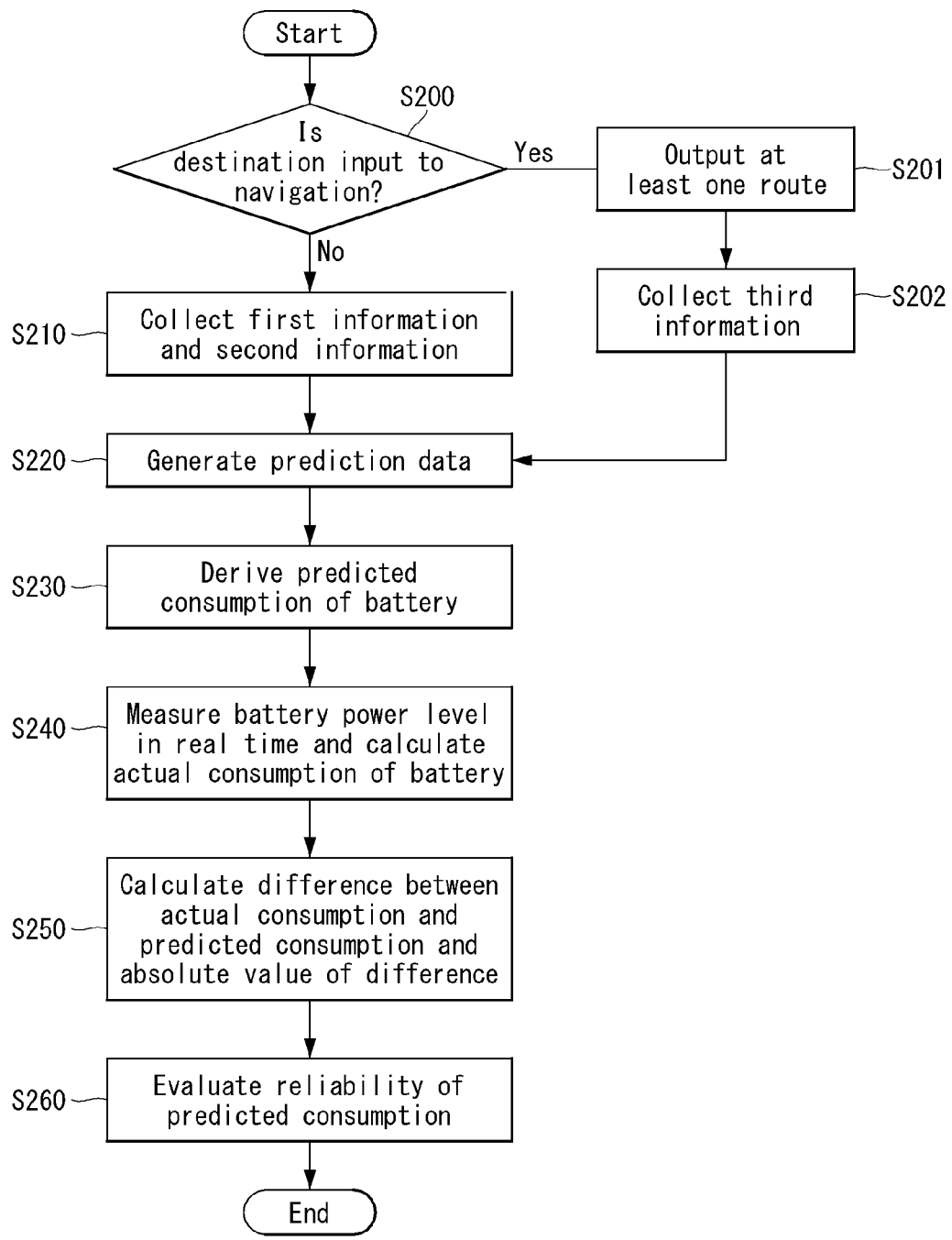
FIG. 17 is a flow chart illustrating a method for predicting a battery consumption of an electric vehicle according to another embodiment of the present disclosure.

With reference to FIG. 17, a method for indicating, by a battery consumption prediction device 100 or a battery consumption prediction system 200 according to the present disclosure, a drivable distance based on a battery power level is described. FIG. 17 is a flow chart illustrating a method for indicating a drivable distance according to an embodiment of the present disclosure.

After the step S160, the prediction module 120 calculates a current battery power level of the electric vehicle 10 based on the predicted consumption or the actual consumption in S190 and calculates a drivable distance of the electric vehicle 10 based on the current battery power level in S191. Next, the drivable distance is displayed to a driver through an output unit 130 or a user equipment 330 in S192.

Figure 18:
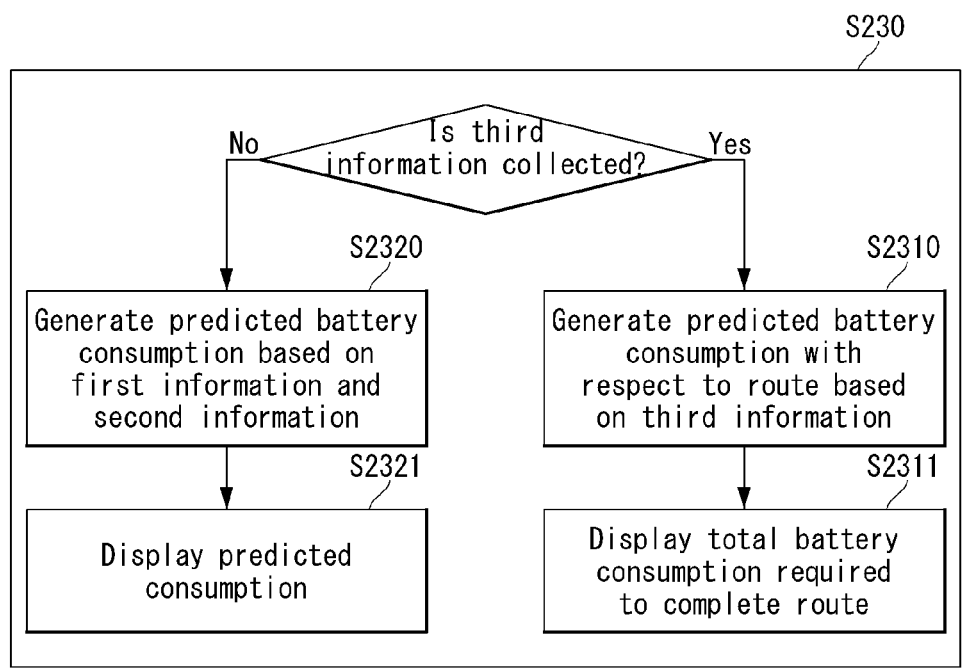
FIG. 18 is a flow chart illustrating a method for deriving a predicted battery consumption according to another embodiment of the present disclosure.

With reference to FIG. 18, a method for predicting a battery consumption of an electric vehicle according to another embodiment of the present disclosure is described. FIG. 18 is a flow chart illustrating a method for predicting a battery consumption of an electric vehicle according to another embodiment of the present disclosure.

First, a driver gets on an electric vehicle 10 and starts it, and thus can provide power to various equipments and units mounted on the electric vehicle 10. The electric vehicle 10 is in a state capable of starting by starting.

Next, the driver may input a destination to a navigation 290 installed in the electric vehicle 10 in S200. If the driver does not input the destination to the navigation 290 in S200, a prediction module 120 calculates a predicted consumption of a battery using first information and second information as in the flow chart illustrated in FIG. 13. Since this was described above, a duplicate description is omitted.

On the other hand, if the driver inputs the destination to the navigation 290 in 5200, the process is performed as illustrated in FIG. 17.

The navigation 290 may output one or more routes for reaching the destination in S201 and recommend the routes to the driver. If the driver selects one route from among the recommended routes, a collection module 110 collects third information about the route selected by the driver. The third information includes a total length of the route selected by the driver, a type of road installed in the corresponding route, and a slope, an altitude above sea level, an altitude deviation and a terrain for each section included in the corresponding route.

The collection module 110 collects and preprocesses raw data included in the third information from the navigation 290 and/or an external server 300, and then generates prediction data of the third information in 5220.

At the same time, the collection module 110 collects first information from the components included in the electric vehicle 10, for example, an object detector 210, a communication unit 220, a driving operator 230, a main ECU 240, a vehicle driver 250, a sensing unit 270, a location data generator 280, and the navigation 290 and collects second information indicating an external environment of the electric vehicle 10 from the external server 300 in S210.

Next, the collection module 110 preprocesses the collected first information and second information and generates prediction data of the first information and the second information in S220.

The prediction module 120 receives, from the collection module 110, both the prediction data of the first information and the second information and the prediction data of the third information to output a predicted consumption, to which all the first to third information is reflected, as a result value using these prediction data as input values of a consumption table 121, in S230. In this instance, the step S230 may include the steps S1310, S1311, S1312, S1313, S1314, S1315 and S1316 included in the step S130.

That is, in the present embodiment, the step S230 of deriving the predicted consumption of the battery may performed including the steps S1310, S1311, S1312, S1313, S1314, S1315 and S1316 described in the previous embodiment.

The collection module 110 measures a battery power level in real time using at least one of the main ECU 240, the vehicle driver 250, and the sensing unit 270 and transmits measured data to the prediction module 120.

The prediction module 120 compares the measured data of the battery power level and a battery power level measured upon the starting of the electric vehicle 10 to calculate an actual consumption in S240.

The prediction module 120 obtains a difference between the actual consumption and the predicted consumption and an absolute value of the difference in S250.

Next, the prediction module 120 evaluates reliability of the predicted consumption according to a magnitude of the absolute value in S260. In this instance, the step S260 may include the steps S1601, S1602 and S1603 included in the step S160, and the steps S161, S170, S180, S181 and S182 may be performed after the step S260.

That is, the step S160 includes the step S1601 that the prediction module 120 determines whether the absolute value of the difference between the actual consumption and the predicted consumption exceeds a first value T1.

For example, if the prediction module 120 has calculated a difference between a predicted consumption and an actual consumption at a first time and has obtained an absolute value of the difference, the prediction module 120 determines whether the absolute value exceeds the first value T1 in the step S1601. A range of the first value T1 refers to a description of a battery consumption prediction device 100 according to an embodiment of the present disclosure.

If the absolute value exceeds the first value T1, the prediction module 120 applies a first feedback to a reliability value of the predicted consumption at the first time and reduces the reliability value of the predicted consumption at the first time in S1602.

On the other hand, if the absolute value is equal to or less than the first value T1, the prediction module 120 applies a second feedback to a reliability value of the predicted consumption at the first time and increases the reliability value of the predicted consumption at the first time in S1603.

In the reliability value, if a predicted consumption is derived in a second item unit 1201 of the consumption table 121 included in the prediction module 120, the learning module 102 may search a previous history, search whether the same predicted consumption has been output under conditions where the same prediction data is input, and give a predetermined reliability to the predicted consumption if the predicted consumption is the same as a previously output predicted consumption according to a search result.

The prediction module 120 can verify the reliability that the learning module 102 gives to the predicted consumption. To this end, the prediction module 120 utilizes feedback values accumulated on the predicted consumption.

That is, the prediction module 120 repeatedly performs the step S160 to accumulate feedbacks on the predicted consumption in S161. If the number of accumulated feedbacks exceeds a predetermined number that is previously determined by a manager, the prediction module 120 adds all the accumulated feedbacks in S170.

Next, the prediction module 120 determines whether a sum of the feedbacks is less than a second value T2, in S180. A range of the second value refers to the description of the battery consumption prediction device 100 according to an embodiment of the present disclosure.

If the feedback sum is less than the second value T2, the prediction module 120 deletes a predicted consumption corresponding to the feedback sum from the consumption table 121 in S181. On the other hand, if the feedback sum is greater than the second value T2, the prediction module 120 adds a predicted consumption corresponding to the feedback sum to the consumption table 121 in S182.

As described above, the battery consumption prediction device, the battery consumption prediction system, and the battery consumption prediction method according to the present disclosure calculate a battery consumption consumed to drive the route considering an external environment of the electric vehicle. Since the battery consumption prediction device, system, and method according to the present disclosure output a drivable distance according to the battery consumption and display the drivable distance to the driver, the driver can check the predicted consumption of the battery displayed on the output unit 130 and previously know a battery amount consumed to complete from a departure to the destination Further, the battery consumption prediction system 200 according to the present disclosure can calculate a route with a minimum battery consumption and recommend the route to the driver when calculating a route recommendable to the driver if the driver inputs a destination to the navigation 290.

In addition, there may occur a case in which as the traffic conditions or the weather such as snow or rain change while the driver inputs a destination to the navigation 290 and drives along the route, more battery consumption may be required than the total battery consumption that is initially predicted to complete the route.

In this instance, the battery consumption prediction system 200 according to the present disclosure requests the navigation 290 to create a new route and allows the navigation 290 to create a route from a place where the electric vehicle 10 is currently located to the destination, which can minimize an additional battery consumption, and to display the route to the driver.

As described above, the battery consumption prediction device, system, and method of the electric vehicle according to the present disclosure accurately predict how much battery the electric vehicle can use while driving and provide it to the driver, and thus can make the use of electric vehicle more convenient.

The present disclosure may be implemented using a computer-readable medium with programs recorded thereon for execution by a processor to perform various methods presented herein. The computer-readable medium includes all kinds of recording devices capable of storing data that is readable by a computer system. Examples of the computer-readable mediums include hard disk drive (HDD), solid state disk (SSD), silicon disk drive (SDD), ROM, RAM, CD-ROM, a magnetic tape, a floppy disk, an optical data storage device, the other types of storage mediums presented herein, and combinations thereof. If desired, the computer-readable medium may be realized in the form of a carrier wave (e.g., transmission over Internet). Thus, the foregoing description is merely an example and is not to be considered as limiting the present disclosure. The scope of the present disclosure should be determined by rational interpretation of the appended claims, and all changes within the equivalent range of the present disclosure are included in the scope of the present disclosure.

What is claimed is:

1. A battery consumption prediction device of an electric vehicle, the battery consumption prediction device comprising:
  at least one processor configured to calculate a battery consumption of the electric vehicle,
  wherein the at least one processor includes:
  a collection module configured to collect first information indicating an overall state of the electric vehicle and second information indicating an external environment of the electric vehicle, and generate prediction data based on the first information and the second information; and
  a prediction module configured to receive the prediction data from the collection module and derive a predicted consumption of a battery of the electric vehicle,
  wherein the collection module is connected to be able to communicate with at least one of a sensing unit, a communication unit, an object detector, a driving operator, a vehicle driver, a location data generator, a navigation, or a main electronic control unit (ECU) of the electric vehicle, and
  wherein if a time interval or a distance interval has passed, the collection module is further configured to collect the first information and the second information from the at least one of the sensing unit, the communication unit, the object detector, the driving operator, the vehicle driver, the location data generator, the navigation, or the main ECU of the electric vehicle.

2. The battery consumption prediction device of claim 1, wherein the prediction module is further configured to:

obtain a difference between the predicted consumption and an actual consumption of the battery that is calculated by measuring the battery in real-time, and an absolute value of the difference;

provide a first feedback that reduces a reliability value of the predicted consumption if the absolute value of the difference exceeds a first value; and provide a second feedback that increases the reliability value of the predicted consumption if the absolute value is equal to or less than the first value.

3. The battery consumption prediction device of claim 2, wherein the at least one processor further includes a learning module that is connected to be able to communicate with the collection module and the prediction module, wherein the learning module is configured to machine-learn the first information, the second information, the predicted consumption, and the actual consumption, calculate the difference between the predicted consumption and the actual consumption and the absolute value of the difference, and output the reliability value of the predicted consumption according to a magnitude of the absolute value.

4. The battery consumption prediction device of claim 2, wherein the prediction module is further configured to output a consumption table that uses the prediction data as an input value and uses the predicted consumption as a result value.

5. The battery consumption prediction device of claim 4, wherein the consumption table includes:

a first item unit into which the first information and the second information are inserted;

a second item unit indicating the predicted consumption as a result of the first item unit; and a third item unit indicating the reliability value of the predicted consumption indicated by the second item unit.

6. The battery consumption prediction device of claim 2, wherein the reliability value is expressed as a natural number, wherein the first feedback is a feedback for adding '−1' to the reliability value, and wherein the second feedback is a feedback for adding '+1' to the reliability value.

7. The battery consumption prediction device of claim 6, wherein the prediction module is further configured to:

output a consumption table that uses the prediction data as an input value and uses the predicted consumption as a result value; and add the first feedback and the second feedback accumulated on the reliability value to calculate a feedback sum.

8. The battery consumption prediction device of claim 7, wherein the prediction module is further configured to delete the predicted consumption corresponding to the feedback sum from the consumption table if the feedback sum is less than a second value that is set to a value in a range of −5 to −10.

9. The battery consumption prediction device of claim 7, wherein the prediction module is further configured to add the predicted consumption corresponding to the feedback sum to the consumption table if the feedback sum is greater than a second value that is set to a value in a range of −5 to −1.

10. The battery consumption prediction device of claim 2, wherein the first value is set to a value in a range of 5 to 10.

11. The battery consumption prediction device of claim 1, wherein the time interval is set to an interval in a range of 1 minute to 5 minutes, and wherein the distance interval is set to an interval in a range of 1 km to 5 km.

12. The battery consumption prediction device of claim 1, wherein the first information includes a drive mode, a drive speed, a number of occupants, a weight of loaded load, a center of gravity, a rapid acceleration history and a rapid deceleration history of the electric vehicle, and a temperature, a usage period, an output, a capacity and a life of the battery.

13. The battery consumption prediction device of claim 1, wherein the second information includes a current time, a temperature and a weather condition around the electric vehicle at the current time, and a traffic state of a route on which the electric vehicle is driving.

14. The battery consumption prediction device of claim 1, further comprising an output display configured to display a battery power level calculated based on the predicted consumption or the actual consumption, and display a drivable distance of the electric vehicle based on the battery power level.

15. A battery consumption prediction system of an electric vehicle, the battery consumption prediction system comprising:

a collection device configured to collect first information indicating an overall state of the electric vehicle and second information indicating an external environment of the electric vehicle, and generate prediction data;

a prediction server configured to derive a predicted consumption of a battery of the electric vehicle based on the prediction data generated by the collection device; and a user equipment configured to display a result calculated by the prediction server, wherein the prediction server is further configured to calculate a difference between the predicted consumption and an actual consumption of the battery, and generate a feedback changing a reliability value of the predicted consumption.

16. The battery consumption prediction system of claim 15, wherein the collection device includes at least one processor configured to collect raw data of the electric vehicle as the first information, preprocess the first information, and generate the prediction data, wherein the at least one processor is connected to be able to communicate with at least one of a sensing unit, a communication unit, an object detector, a driving operator, a vehicle driver, a location data generator, a navigation, or a main electronic control unit (ECU) of the electric vehicle.

17. The battery consumption prediction system of claim 16, wherein the at least one processor is further configured to, periodically or each time the electric vehicle drives a predetermined distance:

collect the raw data from at least one of the sensing unit, the communication unit, the object detector, the driving operator, the vehicle driver, the location data generator, the navigation, or the main ECU; and collect the second information from an external server.

18. The battery consumption prediction system of claim 17, wherein the first information includes a drive mode, a drive speed, a number of occupants, a weight of loaded load, a center of gravity, a rapid acceleration history and a rapid deceleration history of the electric vehicle, and a temperature, a usage period, an output, a capacity and a life of the battery,
  wherein the second information includes a current time, a temperature and a weather condition around the electric vehicle at the current time, and a traffic state of a route on which the electric vehicle is driving.

19. The battery consumption prediction system of claim 15, wherein the prediction server includes:
  a learning module configured to machine-learn the first information and the second information, that are factors capable of changing the predicted consumption and the actual consumption, in association with the predicted consumption and the actual consumption; and
  a prediction module configured to output a consumption table that uses the prediction data as an input value and uses the predicted consumption as a result value.

20. The battery consumption prediction system of claim 19, wherein the prediction module is further configured to:
  obtain a difference between the predicted consumption and the actual consumption that is calculated by measuring the battery in real-time, and an absolute value of the difference;
  provide a first feedback that reduces the reliability value of the predicted consumption if the absolute value of the difference exceeds a first value; and
  provide a second feedback that increases the reliability value of the predicted consumption if the absolute value is equal to or less than the first value.

21. The battery consumption prediction system of claim 15, further comprising an external server configured to transmit the second information to the collection device.

22. A method for predicting a battery consumption of an electric vehicle, the method comprising:
  collecting first information and second information;
  preprocessing the first information and the second information to generate prediction data;
  deriving a predicted consumption of a battery of the electric vehicle using the prediction data as an input value;
  measuring in real-time a battery power level of the electric vehicle and subtracting the measured battery power level from an initial battery power level to calculate an actual consumption;
  obtaining a difference between the predicted consumption and the actual consumption and an absolute value of the difference; and
  evaluating a reliability of the predicted consumption according to a magnitude of the absolute value of the difference.

23. The method of claim 22, wherein evaluating the reliability comprises:
  applying a first feedback that reduces a reliability value of the predicted consumption if the absolute value of the difference exceeds a first value; and
  applying a second feedback that increases the reliability value of the predicted consumption if the absolute value is equal to or less than the first value.

24. The method of claim 23, wherein the first value is set to a value in a range of 5 to 10.

25. The method of claim 23, wherein the first feedback is a feedback for adding '−1' to the reliability value,
  wherein the second feedback is a feedback for adding '+1' to the reliability value.

26. The method of claim 22, wherein deriving the predicted consumption comprises:
  creating a consumption table that uses the prediction data as an input value and uses the predicted consumption as a result value;
  inputting the prediction data to the consumption table;
  outputting the predicted consumption as a result value;
  searching a reliability evaluation history and checking whether there is a previous reliability evaluation result corresponding to the predicted consumption output as the result value; and
  if the previous reliability evaluation result exists in the reliability evaluation history, providing and displaying a reliability value included in the previous reliability evaluation result.

27. The method of claim 22, further comprising, after evaluating the reliability:
  adding a first feedback and a second feedback accumulated on a reliability value of the predicted consumption to calculate a feedback sum; and
  deleting the predicted consumption corresponding to the feedback sum from a consumption table if the feedback sum is less than a first value.

28. The method of claim 27, wherein the first value is set to a value in a range of −5 to −10.

29. The method of claim 27, further comprising, after calculating the feedback sum,
  adding the predicted consumption corresponding to the feedback sum to the consumption table if the feedback sum is greater than the first value.

30. The method of claim 22, further comprising, after evaluating the reliability:
  calculating a current battery power level of the electric vehicle based on the predicted consumption or the actual consumption;
  calculating a drivable distance of the electric vehicle based on the current battery power level; and
  displaying the drivable distance to a driver.

31. The method of claim 22, further comprising, before collecting the first information and the second information:
  inputting a destination to a navigation of the electric vehicle;
  outputting at least a first route for reaching the destination; and
  collecting third information about the first route.

32. The method of claim 31, wherein deriving the predicted consumption comprises:
  calculating a predicted battery consumption with respect to the first route based on the third information; and
  displaying, to the driver, a total battery consumption consumed to complete the first route,
  wherein the third information includes a total length of the first route, a type of road installed in the first route, a slope, an altitude above sea level, an altitude deviation and a terrain for each section included in the first route.

* * * * *